(12) United States Patent
Skidmore

(10) Patent No.: US 10,370,063 B2
(45) Date of Patent: Aug. 6, 2019

(54) MONITORING ENERGY USAGE OF A SURFACE MARITIME VESSEL

(71) Applicant: BAE SYSTEMS plc, London (GB)

(72) Inventor: Adrian Gary Skidmore, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 126 days.

(21) Appl. No.: 15/542,348

(22) PCT Filed: Jan. 6, 2016

(86) PCT No.: PCT/GB2016/050017
§ 371 (c)(1),
(2) Date: Jul. 7, 2017

(87) PCT Pub. No.: WO2016/110693
PCT Pub. Date: Jul. 14, 2016

(65) Prior Publication Data
US 2018/0273144 A1    Sep. 27, 2018

(30) Foreign Application Priority Data

Jan. 9, 2015 (EP) ..................................... 15275004
Jan. 9, 2015 (GB) .................................. 1500337.9

(51) Int. Cl.
*B63B 9/00* (2006.01)
*G01C 21/20* (2006.01)
(Continued)

(52) U.S. Cl.
CPC ............... *B63B 9/001* (2013.01); *B63J 99/00* (2013.01); *G01C 21/203* (2013.01);
(Continued)

(58) Field of Classification Search
CPC ..... B63B 9/001; B63J 99/00; B63J 2099/008; G01C 21/203; G05D 1/0005; G06Q 50/10
(Continued)

(56) References Cited

U.S. PATENT DOCUMENTS

2009/0048726 A1* 2/2009 Lofall ..................... B63H 21/12
701/21
2012/0277941 A1* 11/2012 Noffsinger .............. B63B 49/00
701/21
(Continued)

FOREIGN PATENT DOCUMENTS

EP     2400271 A1    12/2011
EP     2669172 A1    12/2013
(Continued)

OTHER PUBLICATIONS

International Preliminary Report on Patentability received for Patent Application No. PCT/GB2016/050017, dated Jul. 20, 2017. 8 pages.
(Continued)

*Primary Examiner* — Thomas G Black
*Assistant Examiner* — Wae L Louie
(74) *Attorney, Agent, or Firm* — Finch & Maloney PLLC

(57) ABSTRACT

A system (102) is configured to monitor energy usage of a surface maritime vessel (100). The system comprises a device (102A) configured to receive characteristic data representing at least one operating characteristic of the vessel, and a device (102A) configured to receive model data representing at least one energy usage model for the vessel. The system further includes a device (102A) configured to process the characteristic data and the model data to generate an output representing a comparison between the characteristic data and the model data.

20 Claims, 18 Drawing Sheets

(51) Int. Cl.
  *G05D 1/00* (2006.01)
  *G07C 5/08* (2006.01)
  *B63J 99/00* (2009.01)
  *G06Q 10/06* (2012.01)

(52) U.S. Cl.
  CPC .......... *G05D 1/0005* (2013.01); *G06Q 10/06* (2013.01); *G07C 5/085* (2013.01); *B63J 2099/008* (2013.01); *Y02T 70/74* (2013.01)

(58) Field of Classification Search
  USPC .......................................................... 701/21
  See application file for complete search history.

(56) References Cited

U.S. PATENT DOCUMENTS

| | | | |
|---|---|---|---|
| 2014/0336853 A1* | 11/2014 | Bradenham | B63B 49/00 701/21 |
| 2015/0298654 A1* | 10/2015 | Joao | G01S 19/16 701/2 |
| 2016/0009304 A1* | 1/2016 | Kumar | B61L 27/0027 701/19 |
| 2018/0148051 A1* | 5/2018 | Lujan | G08G 1/202 |
| 2018/0150080 A1* | 5/2018 | Gross | G05D 1/0217 |
| 2018/0273144 A1* | 9/2018 | Skidmore | B63B 9/001 |
| 2018/0284735 A1* | 10/2018 | Cella | G05B 23/024 |

FOREIGN PATENT DOCUMENTS

| | | |
|---|---|---|
| EP | 2669173 A1 | 12/2013 |
| WO | 2007017908 A2 | 2/2007 |
| WO | 2010082989 A2 | 7/2010 |
| WO | 2011161211 A2 | 12/2011 |
| WO | 2016110693 A1 | 7/2016 |

OTHER PUBLICATIONS

International Search Report and Written Opinion received for Patent Application No. PCT/GB2016/050017, dated Apr. 13, 2016. 10 pages.

GB Intellectual Property Office Search Report under Section 17(5) received for GB Patent Application No. 1500337.9, dated Jul. 8, 2015. 5 pages.

Extended European Search Report issued for EP Patent Application No. 15275004.8 dated Jul. 22, 2015. 7 pages.

Graziose, et al., "Determining the Efficacy of Modifications to T-AGS 60 Ships (DEMo Tags)." May 6, 2013. 36 pages.

Lu, et al., "Voyage Optimisation: Prediction of Ship Specific Fuel Consumption for Energy Efficient Shipping," Low Carbon Shipping Conference, London 2013. Originally downloaded from the Internet on Jul. 15, 2015. 11 pages.

* cited by examiner

MONITORING ENERGY USAGE OF A SURFACE MARITIME VESSEL

The present invention relates to monitoring energy usage of a surface maritime vessel.

Efficient usage of energy and fuel is becoming increasingly important for all types of vehicles, including surface maritime vessels. Complex vessels can have a great number of operating characteristics/parameters that affect their efficiency. External factors, such as sea state and temperature, can also have an effect. It is therefore desirable for crew to be provided with guidance that will assist with improving efficiency.

Embodiments of the present invention are intended to address at least some of the above technical problems. Embodiments can provide a ship energy assessment system, which acts as a tactical decision support tool on vessels, by feeding back information on the vessel's energy and fuel consumption, endurance, the operating efficiency and how the vessels operating parameters could be adjusted to optimise efficiency.

Embodiments can enable a crew at sea and a user ashore to increase vessel range, decrease fuel costs, minimise refuelling time and/or reduce the associated logistics supply chain by optimising energy consumption in near real time. Embodiments may also enable a crew at sea and ashore to maximise endurance by optimising energy consumption within a mission profile during advance planning, based on actual measured vessel performance data. Embodiments of the system can also allow measurement of benefits (e.g. $CO_2$, SOx and NOx emissions, reduced fuel cost and increased endurance/performance) of implementing the energy saving measures over time, based on actual vessel usage profiles.

According to one aspect of the present invention there is provided a method of monitoring energy usage of a surface maritime vessel comprising:

receiving characteristic data representing at least one operating characteristic of the vessel;

receiving model data representing at least one energy usage model for the vessel, and processing the characteristic data and the model data to generate an output representing a comparison between the characteristic data and the model data.

It should be noted that the "output" is not necessarily displayed (immediately); for example, it may be stored and/or transferred for further use, or can comprise an electrical signal that is used to control a system or vessel component.

The energy usage model may comprise a power vs speed curve for the vessel (calculated for sets of characteristics, such as displacement, sea state and trim). The characteristic data may be based on signals provided by sensors measuring power provided to at least one propulsion device of the vessel, a speed through water of the vessel and/or a draught of the vessel.

The method may further include:
receiving data representing a hotel load of the vessel;
computing a total power used by the vessel using the hotel load data and said characteristic data representing power used by at least one propulsion device of the vessel;
finding a minimum value on the power vs speed curve corresponding to the total current power used, and
outputting the minimum value as an indication of a most efficient speed of the vessel.

The energy usage model may comprise a fuel consumption vs power output profile (for various temperature, pressure and/or prime mover configurations) for the vessel.

The method may further include:
updating the model data using the characteristic data.

The processing of the characteristic data may comprise:
computing a plurality of propulsive power vs speed through water curves representing various vessel displacements, sea states and vessel trim categories, and
computing a plurality of fuel use vs power generated curves representing various vessel propulsion unit configurations.

The method may include generating or updating a said energy usage model comprising the power vs speed curve. This generating or updating can include steps of:
obtaining data representing propulsion power used by the vessel and corresponding vessel speed for a characteristic (e.g. a set of displacements, a set of sea states and/or a set of trims);
computing a curve based on the obtained data;
computing coefficients of the curve;
generating the energy usage model using the coefficients.

The energy usage model may comprise an auxiliary electrical device load vs defined operating scenarios for the vessel.

The output can include data relating to an efficiency curve that gives an indication of a speed that can result in the optimum fuel consumption for a prime mover configuration of the vessel.

A said energy usage model may represent the vessel running using one propulsion device, such as a forward or an aft Gas Turbine (GT) alternator, and another said energy usage model may represent the vessel running using more than one propulsion device, such as a forward and an aft GT alternator for electrical propulsion, or gearbox for mechanical propulsion systems. The output may indicate a comparison of energy efficiency of the vessel running using the one propulsion device and running using the more than one propulsion device.

The output can include a usage profile that gives an indication of the ship's speed, power usage and auxiliary load usage over a period of time (e.g. since the start of a mission).

The output may be used to directly modify operating characteristics of the vessel in order to improve energy usage/efficiency, or may give an indication to a user of how to modify operating characteristics of the vessel in order to improve energy usage/efficiency.

The energy usage model may be at least initially generated using data representing sensor readings of characteristic data taken at intervals of around 1 minute.

The characteristic data may be based on signals provided by sensors measuring at least one from a set comprising: vessel draught; ambient air temperature; water temperature; speed through water; rudder position; forward/aft engine load or power; fuel flow rate for at least one propulsion component; shaft speed; fin angle.

The method may further include receiving data representing external operating conditions. This data may also be processed in order to generate the output. The data representing external operating conditions may be selected from a set including: weather conditions (windage, barometric pressure, air and/or sea temperature); tidal effects; sea state; displacement changes; changes to vessel condition; fuel quality and/or vessel equipment condition.

The method may include receiving data representing planned passage, mission profile and/or onboard electrical energy requirements. This data may also be processed in order to generate the output.

The method may output a prediction of future performance and may perform computations that provide "what if" scenario planning.

According to another aspect of the present invention there is provided a system configured to monitor energy usage of a surface maritime vessel, the system comprising:

a device configured to receive characteristic data representing at least one operating characteristic of the vessel;

a device configured to receive model data representing at least one energy usage model for the vessel;

a device configured to process the characteristic data and the model data to generate an output representing a comparison between the characteristic data and the model data.

The device configured to receive characteristic data may, in use, be in communication with a Platform Management System (PMS) or sensor data logging equipment of the vessel to receive the characteristic data.

According to another aspect, the present invention provides a vessel including a system substantially as described herein.

According to another aspect, the present invention provides a vessel Platform Management System (or sensor data logging equipment) including a system substantially as described herein.

According to another aspect, the present invention provides a method of creating an operating characteristic profile for a vessel, the method comprising:

receiving data representing a set of sensor signals corresponding to operating characteristics of the vessel;

using the received data to compute an operating characteristic profile over a period of time.

The operating characteristic profile may be computed based on a frequency count of each time there is an occurrence of a predefined condition relating to the operating characteristic.

According to another aspect, the present invention provides a method of improving efficiency of a vessel substantially as described herein.

According to another aspect, the present invention provides a method of generating (or dynamically updating) an energy usage model for a vessel substantially as described herein.

According to further aspects of the present invention there are provided computer-readable storage medium including instructions that, when executed on a processor, causes the processor to perform methods substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
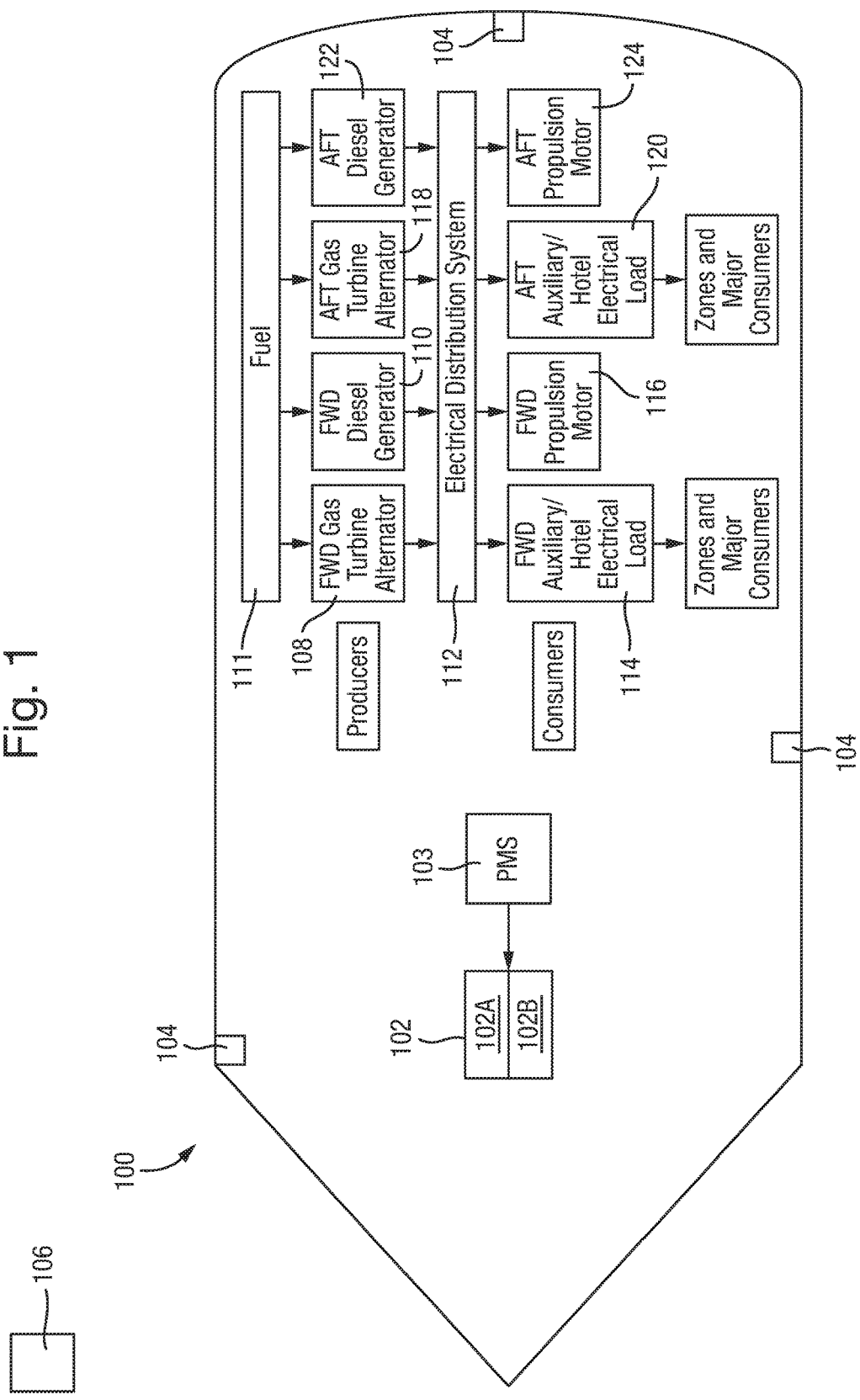
FIG. 1 schematically shows a vessel in communication with an example computing system configured to monitor energy usage.

Referring to FIG. 1, an example surface maritime vessel 100, such as a ship, is shown. A computing system 102 is in communication with the ship. The system includes a processor 102A and memory 102B and is in communication with a Platform Management System (PMS) 103 of the ship. The PMS is in communication with a plurality of sensors 104 of various types mounted at various locations of the vessel. The system 102 can also be in communication with at least one other device 106 remote from the ship.

It will be understood that the communication between the various components can be implemented using any suitable wired or wireless means, e.g. a wired interface between the system 102 and the PMS 103, if the system is located onboard the ship, or satellite communication with the remote device(s) 106. The system can also include, or be in communication with, user interface components, such as input devices, one or more display, etc. In alternative embodiments, at least some of the components of, or functions described as being performed by, the system 102 can be distributed across one or more computing devices, which may or may not be located on the ship. Also, some embodiments of the system can communicate directly with at least one sensor (rather than via the PMS).

The ship 100 further includes components that are used for propelling it over water and for providing electrical power to onboard appliances. In the illustrated example, the ship includes a forward Gas Turbine (GT) alternator 108, which can use fuel from a supply 111, and is connected, via an electrical distribution system 112, to a forward auxiliary/hotel electrical load 114 that can provide electrical power to appliances in particular zones of the vessel and major consumers.

The example ship 100 further includes a forward Diesel Generator (DG) 110 that can provide power to a forward propulsion motor 116; an aft GT alternator 118 that can provide power to aft auxiliary/hotel electrical load 120, and an aft DG 122 that can provide power to an aft propulsion motor 124. These producer components can also use fuel from the supply 111 and are connected to their respective consumer components via the electrical distribution system 112. It will be appreciated that the illustrated components are exemplary only and in other embodiments alternative and/or additional energy producers/consumers/storage devices could be present and will require energy management.

Embodiments of the system 102 can be configured to process data based on the measurements provided by the sensors 104 and model data representing vessel usage/activity profiles (as well as user inputs in some cases), which can be used to generate various outputs relating to the energy usage of the vessel 100. The output may be used to give an indication to a user of how to modify operating characteristics of the vessel in order to improve energy usage/efficiency, or may even be used to directly control such operating characteristics. Embodiments of the system allows energy to be managed as a finite commodity, with inputs such as planned passage and mission profile and onboard electrical energy requirements for the duration of deployment, enabling prediction of future performance, "what if" scenario planning and "benefit/penalties" of integrating future notional energy reduction measures.

In a typical large ship, there may be thousands of different sensors that provide feedback to the PMS 103 or sensor data logging system on various systems of the ship. In order to create the model data and profiles for one embodiment, the inventors exported measurement data, including time/date information, from the PMS for analysis. One method of obtaining the data from typical PMS and data logging systems is to set up 'trends', where each trend can accommodate multiple signals for display and export.

Based on characteristics of the data downloaded, a data sample with measurements of one parameter every 10 minutes for a period of 24 hours, will have a file size of approximately 12 KB in .CSV format and 30 KB in .xls format. The inventors found an issue with reading data at this frequency because the time stamp of individual measurements can vary. For example, the timing of individual readings on a sample system drifts by up to 3 seconds every reading resulting in drifting of on average 5 minutes over a 24 hour period. This is important because if the vessel is not operating in steady state conditions then parameters which are not sampled within a very short interval of one another will not be able to be related directly. By reviewing data downloads the inventors determined that readings made within a minute had a far higher degree of correlation to the expected design line. Therefore, in embodiments the interval between readings is reduced, so that the variation in the timing of the data is reduced to 1 minute. It will be appreciated that the intervals could vary and still provide acceptable results; the variation in timing could be around 1 minute, e.g. around 45-75 seconds.

Given the wide range of sensor parameters available for download, the inventors conducted further analysis on the parameter database to identify the most important variables to record. Having filtered and sorted the list of parameters available a set of fields was selected to achieve the required platform performance measures. The selected parameters used in one example embodiment are shown in the table below:

| Parameter Number | Parameter | Units |
|---|---|---|
| 1 | Ships Draught Measurement Aft | M |
| 2 | Ships Draught Measurement Fwd | M |
| 3 | Ships Draught Measurement Midships Port | M |
| 4 | Ships Draught Measurement Midships Stbd | M |
| 5 | METOC Ambient Air Temperature | deg C. |
| 6 | METOC Sea Water Temperature | deg C. |
| 7 | NAVS Ship Speed Through Water | m/s |
| 8 | NAVS Actual Ships Speed | m/s |
| 9 | NAVS Rudder Position Port | Degrees |
| 10 | NAVS Rudder Position Stbd | Degrees |
| 11 | DG Fwd Engine Load | % |
| 12 | DG Aft Engine Load | % |
| 13 | Aft Drive Pwr Feedback KW | kW |

-continued

| Parameter Number | Parameter | Units |
|---|---|---|
| 14 | Aft Drive Torque Feedback | KNm |
| 15 | Fwd Drive Pwr Feedback KW | kW |
| 16 | Fwd Drive Torque Feedback | KNm |
| 17 | DG Aft Pwr KW | kW |
| 18 | DG Fwd Pwr KW | kW |
| 19 | GTA Aft Pwr KW | kW |
| 20 | GTA Fwd Pwr KW | kW |
| 21 | Fwd Serv Xfrmr Feeder KW | kW |
| 22 | Aft Serv Xfrmr Feeder KW | kW |
| 23 | Aft Power Available for Propulsion KW | kW |
| 24 | Fwd Power Available for Propulsion KW | kW |
| 25 | Aft GT Fuel flow rate | l/min |
| 26 | Fwd GT Fuel flow rate | l/min |
| 27 | Fwd Swbd Shore Supp CB Pwr (kW) | kW |
| 28 | Aft Swbd Shore Supp CB Pwr (kW) | kW |
| 29 | Port Shaft Speed (control) | rpm |
| 30 | Stbd Shaft Speed (control) | rpm |
| 31 | Port Stab Fin Angle Ind | Degrees |
| 32 | Stbd Stab Fin Angle Ind | Degrees |
| 33 | Ships Water Speed | kts |
| 34 | Ships Ground Speed | kts |

It will be understood that the above selected parameters are exemplary only and in other embodiments some may be omitted, and/or additional/alternative parameters may be used. For instance, variables that affect different aspects of vessel performance, particularly in the management of the electrical load distributed to auxiliaries, may be used. From analysis of the selected parameters, the inventors created profiles and algorithms used in the system 100, as will be discussed below in detail.

Figure 2:
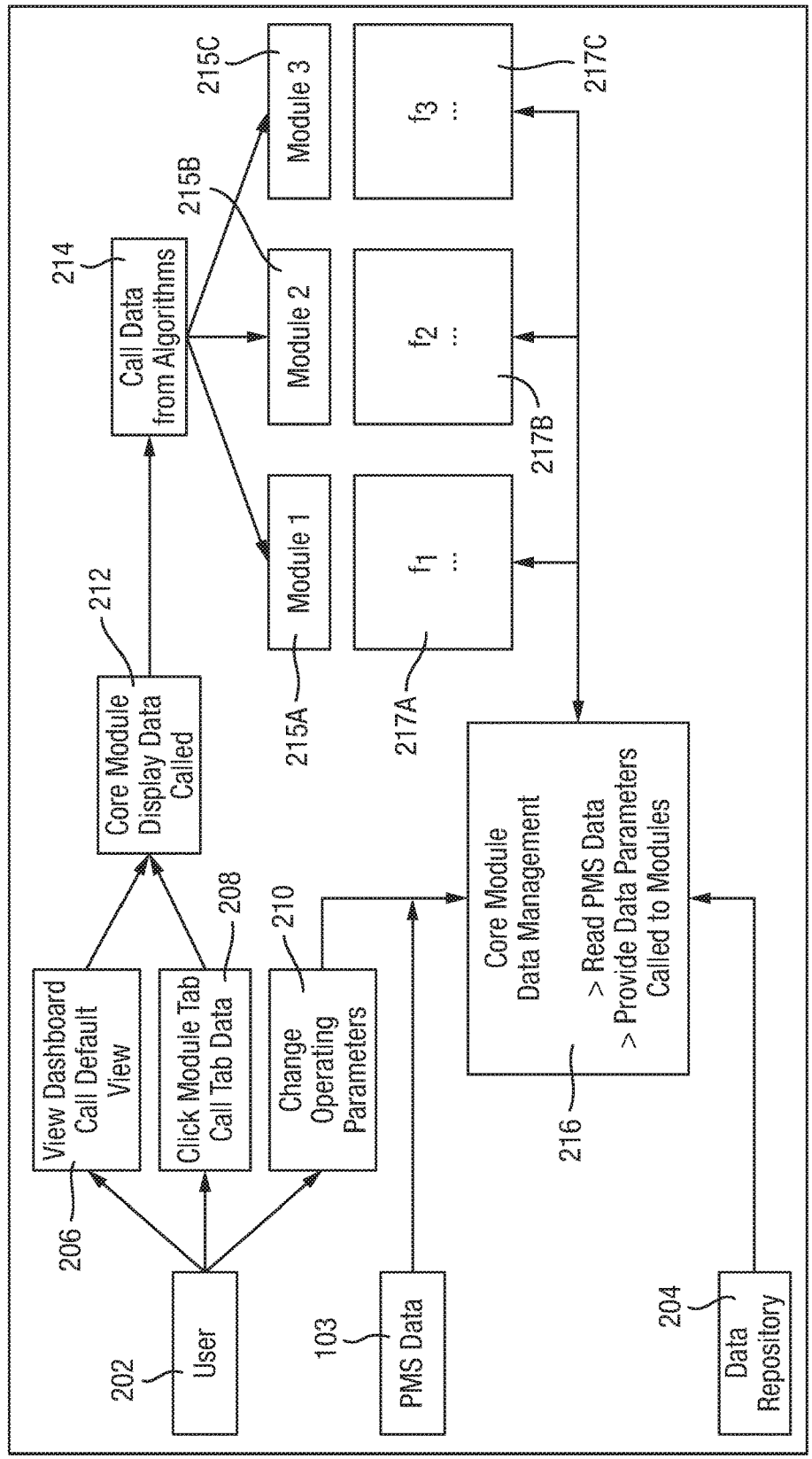
FIG. 2 is a data flow diagram for the example system.
Figure 9:
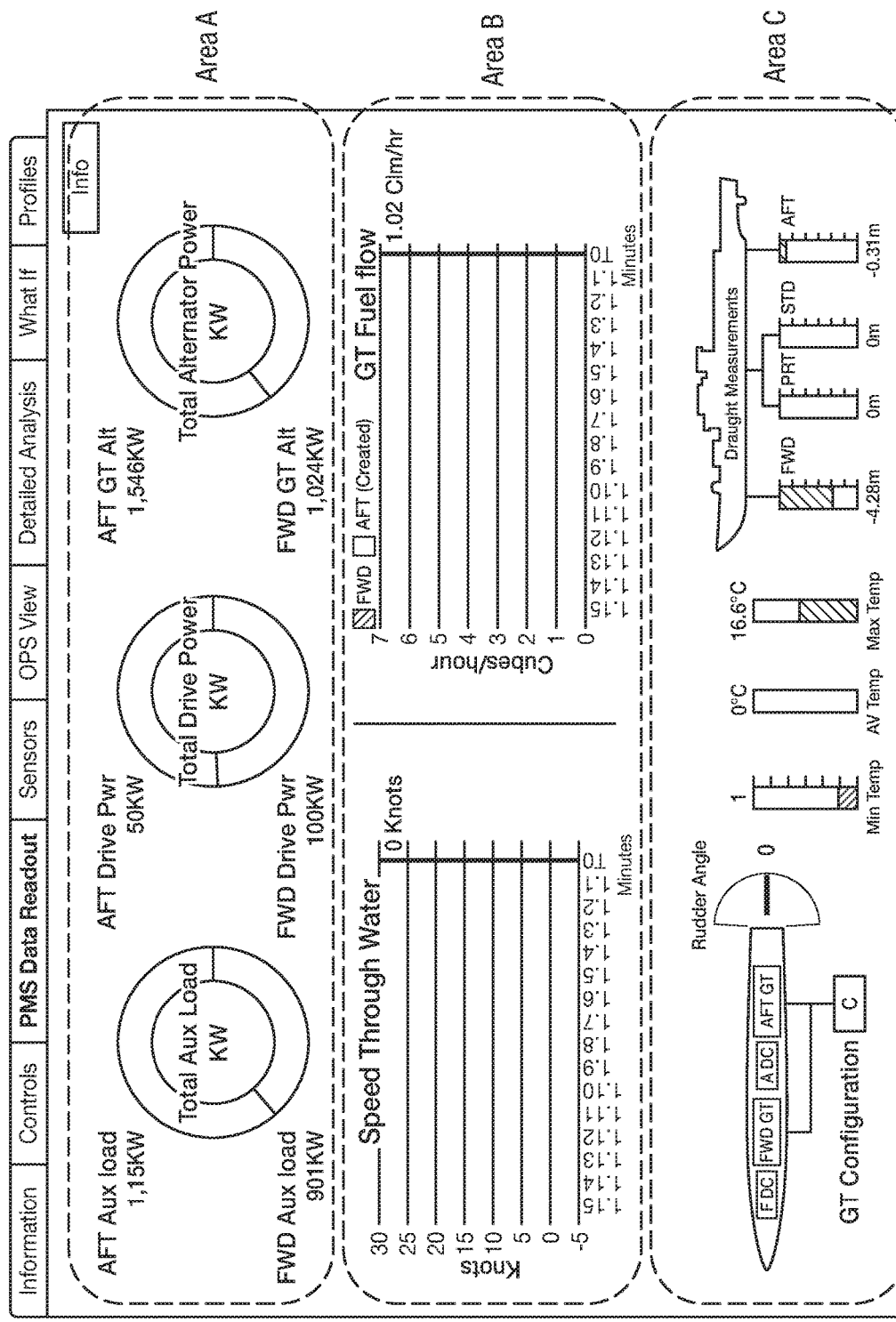
FIGS. 9 to 15 are example screen displayed produced by embodiments of the example system.

FIG. 2 is a data flow diagram for an example embodiment of the system 102 configured to execute software that provides functions as described herein. Input data may be provided by a user 202, a PMS or sensor data loggers 103 and a data repository 204, which can contain data representing the models/profiles described herein. The user data can be used to select various interfaces, including a dash view 206, a module tab 208 or a change of operating parameter interface 210. FIG. 9 onwards (described below) give detailed examples of user interface screens generated by an embodiment of the system. A core module of the software being executed by the system can cause the selected interface to be displayed 212. User interaction with the displayed interface can result in data being updated and called 214 for use by various modules 215A, 215B, 215C of the system (which perform functions 217A, 2176, 217C, respectively), as will be described below.

The module 215A is designed to advise on the best optimisation of the vessel prime mover/generator configuration, or optimisation of the vessel's operation for a given prime mover configuration.

The module 215B is focused on the display of platform usage monitoring data. The logic used to calculate this is a frequency count of each time there is an occurrence of a set of predefined conditions.

The module 215C is focussed on vessel energy management, the module allows the generation of 'what if' scenarios, to highlight how 'energy saving measures', known as 'Energy Options' might affect the vessels energy footprint through life.

It will be understood that the number and nature of the modules described herein are exemplary only and in alternative embodiments, the functions performed by one or more of the modules may be omitted, performed by at least one other module (in addition to, or instead of the module, described as performing the function), and/or additional modules can be provided.

In the event of the user initiating the operating parameter change interface 210, a core module 216 of the software can receive data from a PMS 103 and provide data parameter called to the functions 217A, 217B, 217C that correspond to the modules 215A, 215B, 215C.

Figure 3:
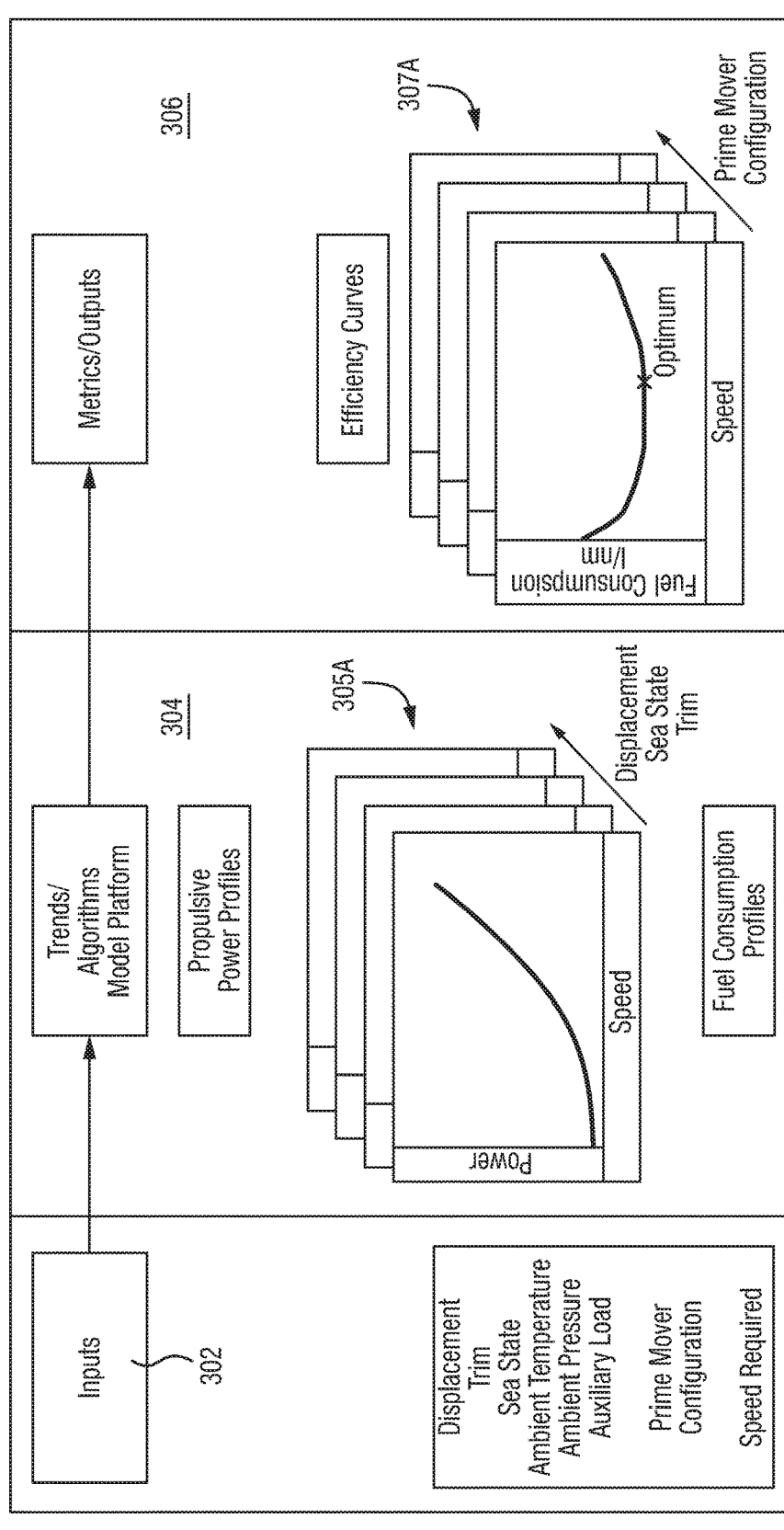
FIG. 3 is a concept interface diagram for the example system.
Figure 3:
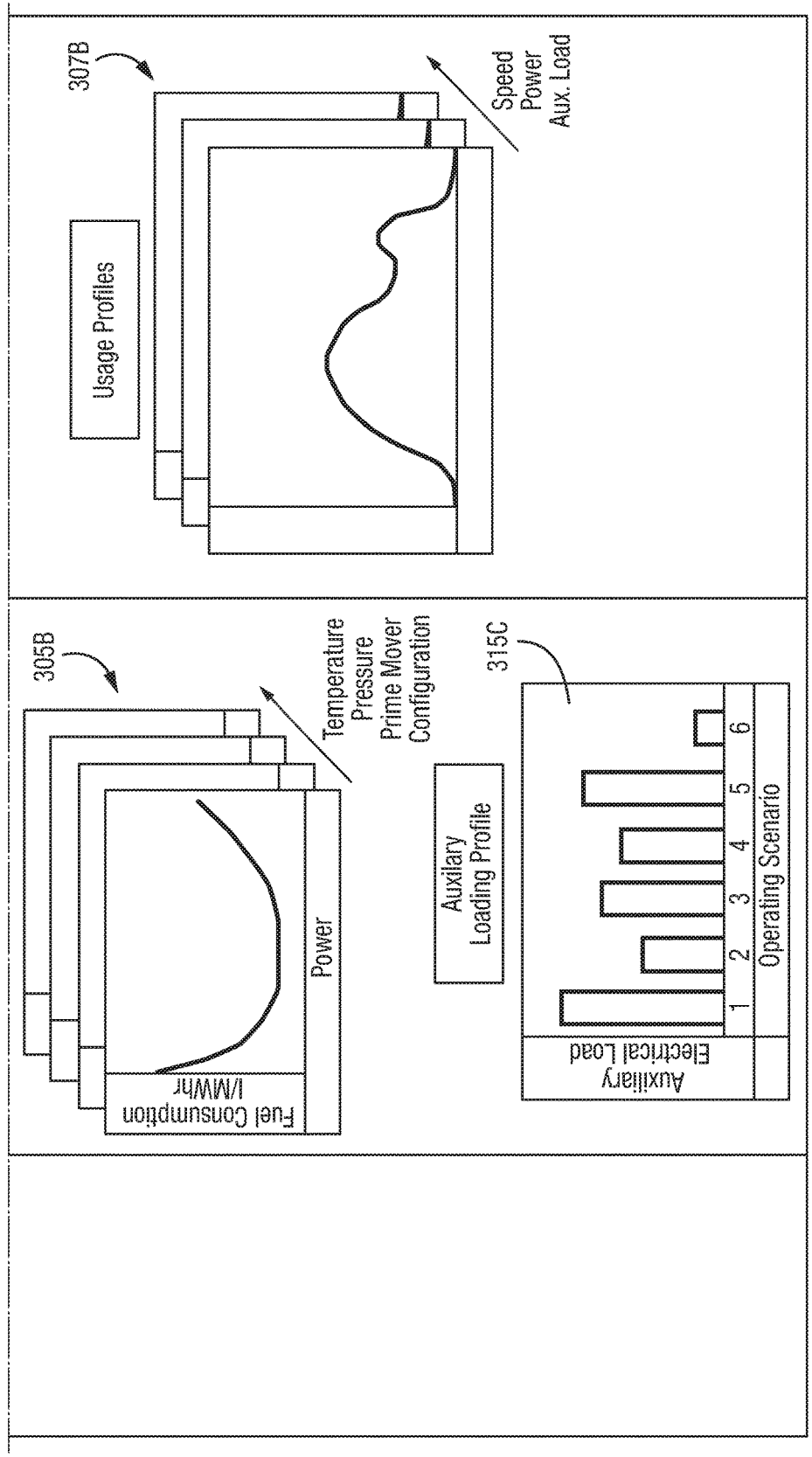

FIG. 3 shows how the exemplary data flow of FIG. 2 transfers the input data into trends and algorithms which model the vessel, before generating metrics and outputs from these. The inputs 302 can correspond to the inputs 202, 103 and 204 of FIG. 2. The graphs in the middle column 304 of FIG. 3 correspond to examples of the types of profiles/model data that can be generated/used, including propulsive power vs speed profiles 305A (for various displacements, sea states and/or trims); fuel consumption vs power output profiles 305B (for various temperature, pressure and/or prime mover configurations), and an auxiliary electrical device load vs defined operating scenarios profile 305C.

The right-hand column 306 of FIG. 3 represents examples of outputs that can be provided to the user, including an efficiency curves 307A that can, for example, give an indication of the speed that can result in the optimum fuel consumption for the current prime mover configuration, and usage profiles 307B that can, for example, give an indication of the ship's speed, power usage and auxiliary load usage over a period of time (e.g. since the start of a journey).

Figure 4:
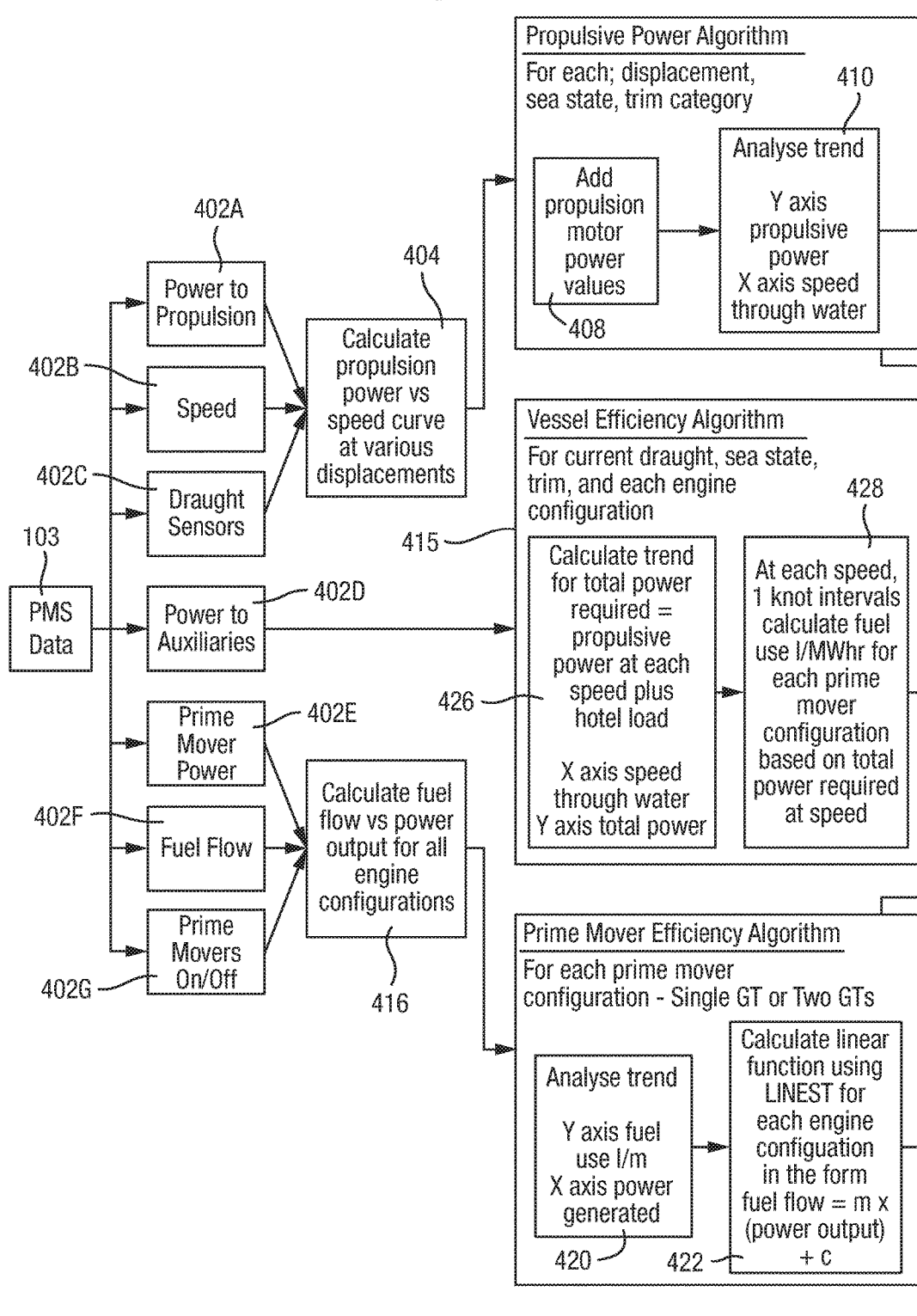
FIG. 4 is a data flow diagram for a first module of the example system.
Figure 4:
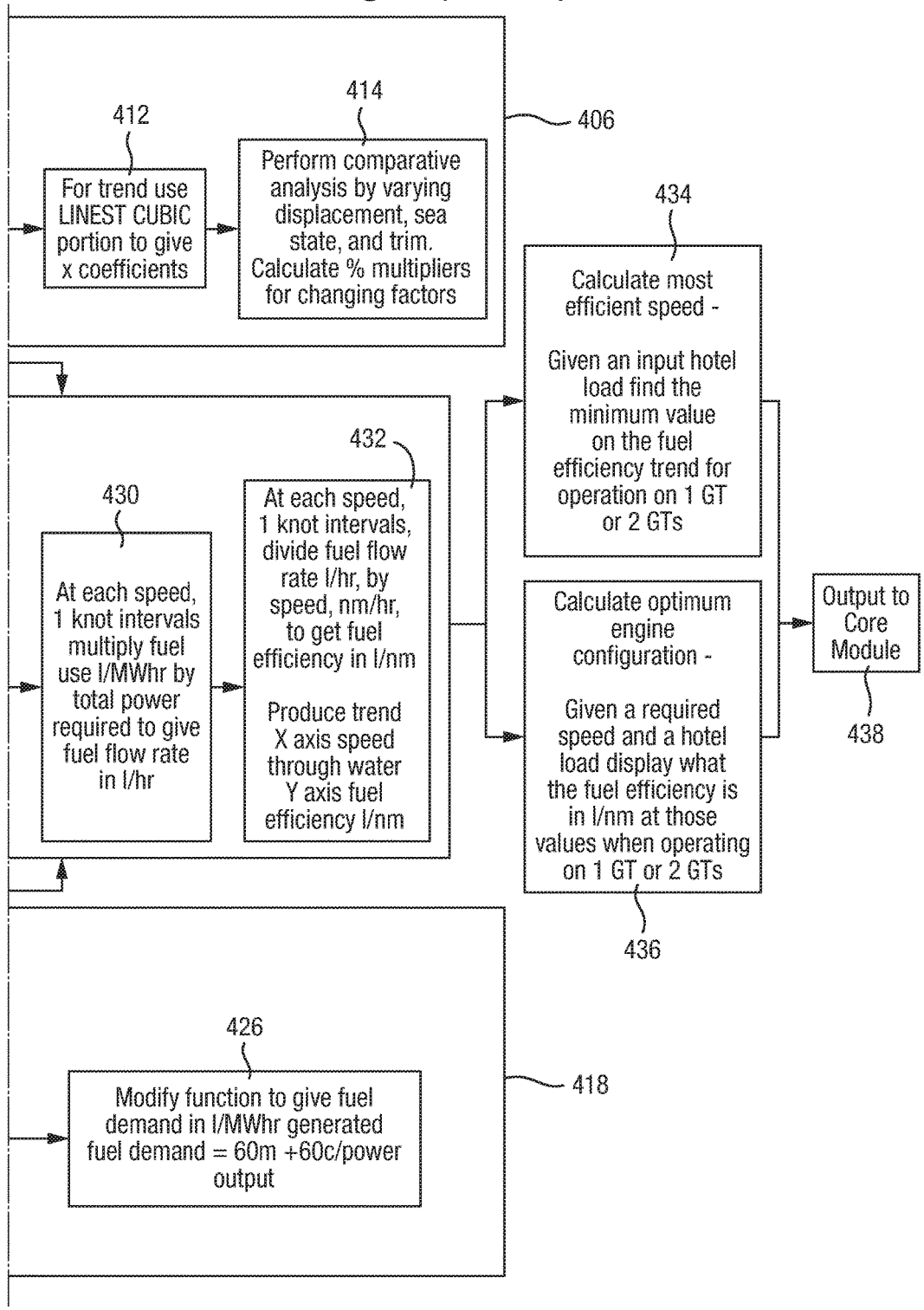

FIG. 4 is a definition diagram for the first module 215A, which is designed to advise on the optimisation of the vessel prime mover/generator configuration, or optimisation of the vessel's operation for a given prime mover/generator configuration. The algorithms which describe the prime mover optimisation function of the module 215A comprise a propulsive power algorithm; a vessel efficiency algorithm, and a prime mover efficiency algorithm. The flow of data and the logic steps involved in these algorithms are illustrated in FIG. 4.

Given the correlation at a 5 minute steady state period was greater than 0.95 it was deemed that this data set would be used for further analysis to produce the algorithm.

By referencing the draught sensors it was possible to isolate the performance of the vessel based on the displacement and trim of the vessel. By averaging the aft and amidships draught sensors it was possible to categorise the vessels depth in the water, which directly correlated to its displacement. The forward trim sensor was excluded from this calculation because as the vessel goes through the speed range the bow wave generated gives a false reading, as a bow wave is generated at the front of the vessel which increases with size as the speed increases.

Using the draught marks, the operating draught of the vessel can be categorised. Given the maximum operating draught range of the example ship, normal operations should only see a variance of a known value and it is recommended the draught readings are categorised into 0.05 m interval groups. Given a data set with all parameters (sensors) operating, separate trends can be generated for operating at different draught groups, this could allow an adjustment factor to be applied throughout the speed range for any change in draught.

Given the interaction between vessel speed and the forward trim sensor due to the increasing bow wave with increasing speed, vessel trim was also characterised using the relationship of the amidships draught sensors and the aft draught sensor. The total vessel trim is shown in Equation 1 below, assuming that the centre of flotation is approximately at amidships. Even when the centre of flotation is away from the vessel amidships point the formula can still hold its point of reference, as all system calculations of trim can be calculated in the same manner, as such the true accuracy of trim was not considered of further relevance.

Trim calculation                                    Equation 1
$$\mathrm{Trim} = \frac{\mathrm{BAL\_0008} + \mathrm{BAL\_0009}}{2} - 2 \times \mathrm{BAL\_0006}$$

The example vessel design trim range varied between a known maximum and minimum distance. To keep the data sets suitably sized it was recommended that this be split into 6 groups covering ranges of 0.15 m. The system is able to generate speed power profiles for each of these groups, and the percentage difference to the propulsive power requirements at the design draught will be applied throughout the system.

A speed/power plot can be categorised by the difference between the maximum and minimum draught observed in each minute period, highlighting what the maximum wave height is passing by the sensor. This can be completed by using the average wave height seen by all draught sensors. The forward draught sensor experiences the greatest interaction caused by ships motions, potentially exacerbating the wave height experienced.

The Sea States are defined by the table below:

TABLE

| Sea State Wave Height Definition | |
|---|---|
| Sea State | Wave Height (m) |
| 0 | 0 |
| 1 | 0-0.1 |
| 2 | 0.1-0.5 |
| 3 | 0.5-1.25 |
| 4 | 1.25-2.5 |
| 5 | 2.5-4.0 |
| 6 | 4.0-6.0 |

Above sea state 6, the draught sensors are unable to recognise the wave height; furthermore, the amount of time a vessel is operated in these conditions is likely to be extremely low, and given conditions beyond sea state 6, vessel operation is going to be defined by environmental conditions rather than the requirement to optimise vessel energy performance.

TABLE

| Sea State Categories | | |
|---|---|---|
| Sea State Group | Number of data points | $R^2$ value |
| 0 | 15 | 0.9922 |
| 1 | 94 | 0.9871 |
| 2 | 721 | 0.9848 |
| 3 | 4833 | 0.9629 |
| 4 | 3722 | 0.9053 |
| 5 | 1037 | 0.8302 |
| 6 | 107 | 0.9430 |

The table above demonstrates that there are comparatively few data points for plotting the trend relationships for propulsive power and speed at sea states 0, 1, and 6. This confirms what is apparent from the shape of the trends for sea states 0, 1, and 6—that they do not conform to the expected plot profile and can be discounted.

From 0 to 12 knots the trends do not deviate greatly. This is expected, as again, surface friction of the hull form is expected to dominate. From 12 knots to 20 knots the trend lines show marked separation in the expected order, with the power required to achieve a speed increasing by a predicted value for each increase in sea state.

Above a high propulsive power threshold, the trend line for Sea State 5 appears to fall below the propulsive power required for sea states 2, 3, and 4, which remain in the order expected, with increasing power required for increasing sea state. At very high power settings, the trend lines for sea states 2, 3, and 4 converge and cross, which is not the expected result. This is accounted for by the decreasing number of data points for the various sea states, at faster operating speeds.

The data indicated that there is a minimal effect below 10 knots. From 10 knots to 22 knots, sea states 2, 3, 4, and 5 have the effect described in the table below.

TABLE

Percentage effect of sea state on propulsive power requirement, when compared to 5 minute steady state power requirements with rudder angle less than 5 degrees

| Speed Through Water (knots) | Sea state 2 | Sea state 3 | Sea state 4 | Sea state 5 |
|---|---|---|---|---|
| 12 | −17 | −2 | 5 | 10 |
| 14 | −18 | −1 | 4 | 11 |
| 16 | −15 | −1 | 3 | 8 |
| 18 | −12 | −1 | 3 | 5 |
| 20 | −9 | −1 | 2 | 2 |
| 22 | −6 | −1 | 1 | −2 |

These figures can allow the adjustment of the propulsive power requirement based on the sea state experienced by the vessel at any given time. With more data collated by the system over time, the quality of percentage adjustment, and the speed boundaries these are applied to can be improved.

Using the rudder angle sensors the effect of adjustments to rudder angle on the propulsive power against speed plot can be investigated. The rudder angles were categorised into four categories as described in the table below.

TABLE

Rudder Angle Group Characteristics

| Rudder Angle | Number of data points | $R^2$ value |
|---|---|---|
| 0°-5° | 9326 | 0.9724 |
| 5°-15° | 975 | 0.8116 |
| 15°-25° | 175 | 0.8676 |
| 25°-40° | 128 | 0.8851 |

Embodiments of the system can provide tactical feedback to operators to allow the operator to optimise a vessels performance. In doing so, it is important to understand the effects that the rudder angle and resulting turn might have on the vessel performance, characterised by the dataset. The table showing percentage effect of sea state on propulsive power requirement above illustrates that, proportionally, very little time is spent at large rudder angles, highlighting the reduced requirement to optimise the vessels performance during maneuvering.

The propulsive power and speed trends change with the change in rudder angle, with a clear increase in propulsive power required to hold a speed with increasing rudder angle.

The data showed the significant effect rudder angle has on the propulsive power required to achieve a given speed through the water. As a result, embodiments of the system may only use propulsive power against speed data where the ships rudder angle is less than 5 degrees.

The resulting steps performed by the propulsive power algorithm 406 can be summarised as: at step 408 the values of the propulsion motors' power are added together. Then, at step 410, the trend is analysed to produce a profile/graph where the Y axis represents propulsive power and the X axis represents the speed through the water. At step 412 for the trend, the LINEST CUBIC portion is used to give x coefficients. Finally, comparative analysis is performed by varying displacement, sea state and trim. Percentage multipliers for changing factors are determined at step 414. The output of the algorithm can be passed to a vessel efficiency algorithm 415.

Vessel efficiency can be based on a combination of propulsive power and service/hotel load power and how the power to meet demand is derived (prime mover/generator configuration). Typically, the greater the service load and the slower the ship below optimum cruise speed, the less efficient the transit. Similarly, the lower the service load and the closer to the optimum cruise speed the hull is operating at, the more efficient the ship.

Inputs relating to prime mover power 402E, fuel flow 402F and prime movers on/off state 402G are received at step 416 to calculate fuel flow against power output curves for all engine configurations. This is then passed on to the primer mover efficiency algorithm 418.

Using fuel flow sensors, and gas turbine alternator power output meters the fuel flow rate was plotted by the inventors against the GTA power output. The results were 'fitted' with a linear trend line.

The fuel consumption, in liters per MW/hr generated, can then be calculated.

The resulting steps performed by the prime mover efficiency algorithm 418 (for each prime mover configuration; single GT or two GTs) can be summarised as: at step 420, analyse the trend of the profile/graph where the Y axis represents fuel use (Wm) and the X axis represents power generated. At step 422 the linear function is calculated using the LINEST function for each engine configuration using a suitable algorithm. This output can then be passed to the vessel efficiency algorithm 415.

It now becomes possible to calculate the total efficiency of operating the vessel on either 1 GTA or 2 GTAs. A total power requirement can be calculated from A required auxiliary electrical load—defined by the electrical design data for various operational scenarios;

The propulsive power required given the propulsive power against speed trend, adjusted for any environmental conditions.

Figure 5:
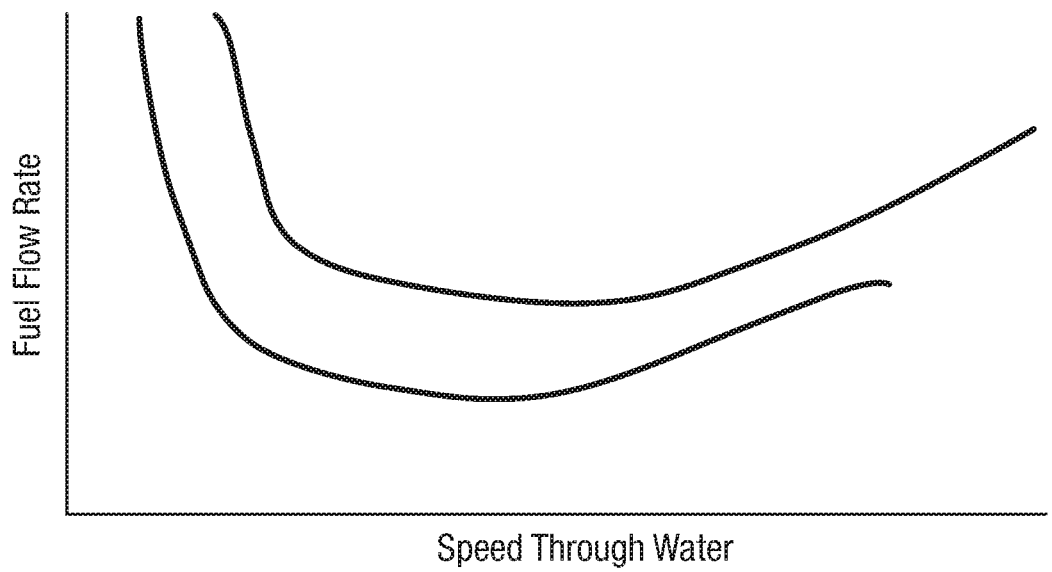
FIG. 5 is a graph showing a typical vessel efficiency curve, for a notional vessel, that can be processed by the first module.

Given the total power required it is possible to calculate, at each speed, the fuel flow required to achieve the speed and auxiliary hotel load combined. This results in a vessel efficiency curve describing the liters of fuel consumed to complete a distance of 1 nautical mile. From a typical performance curve (a notional example of which is illustrated in FIG. 5), derived from the above, it is possible to calculate the most efficient operating speed for running on one or two gas turbines—the lowest point on the graph; similarly, characteristics for DG power and combinations of GT/DG power generation can be added to this chart to determine optimum combinations to meet various anticipated loads. The zero values recorded at the highest speeds for each efficiency curve have been recorded, as at this point, for the configuration of vessel selected, the gas turbines cannot generate the power required to achieve the speed.

The resulting steps performed by the vessel efficiency algorithm 415 (which, as discussed above, receives results from the propulsive power algorithm 406 and the prime mover efficiency algorithm 418, as well as sensor data relating to power to auxiliaries 402D) can be summarised as: at step 426, the trend for total power required is calculated as corresponding to the power at each speed plus hotel load. In the resulting graph the X axis represents speed through water and the Y axis represents total power. At step 426, the fuel use in l/MWhr for each prime mover configuration (at each speed, 1 knot intervals) is calculated, based on total power required at speed. At step 430, the fuel use in l/MWhr (at each speed, 1 knot intervals) is multiplied by the total power required in order to give the fuel flow rate in l/hr. At step 432, the fuel flow rate (at each speed, 1 knot intervals) l/hr is divided by speed, nm/hr to get fuel efficiency in l/nm. In the resulting trend graph, the X axis represents speed through water and the Y axis fuel efficiency in l/nm.

The outputs of the vessel efficiency algorithm 415 can be used to calculate the most efficient speed (process 434). Given an input representing hotel load, this process can find the minimum value on the fuel efficiency trend for operation on 1 GT or 2 GTs and any other combination, including use of DGs, to supply the required power. Use of energy storage to source the power can also be included here.

The outputs of the vessel efficiency algorithm 415 can also be used to calculate the optimum engine and energy storage (where fitted) configuration (process 436). Given inputs representing a required speed and a hotel load, this process can find and display the corresponding fuel efficiency in l/nm at those values when operating on 1 GT or 2 GTs.

The outputs of processes 434 and 436 can be passed on to the core module 216 at step 438 for further processing/display in the user interface.

The Module 215B is focused on the display of platform usage monitoring data. The logic used to calculate this is a frequency count of each time there is an occurrence of a set of predefined conditions discussed below.

Figure 6:
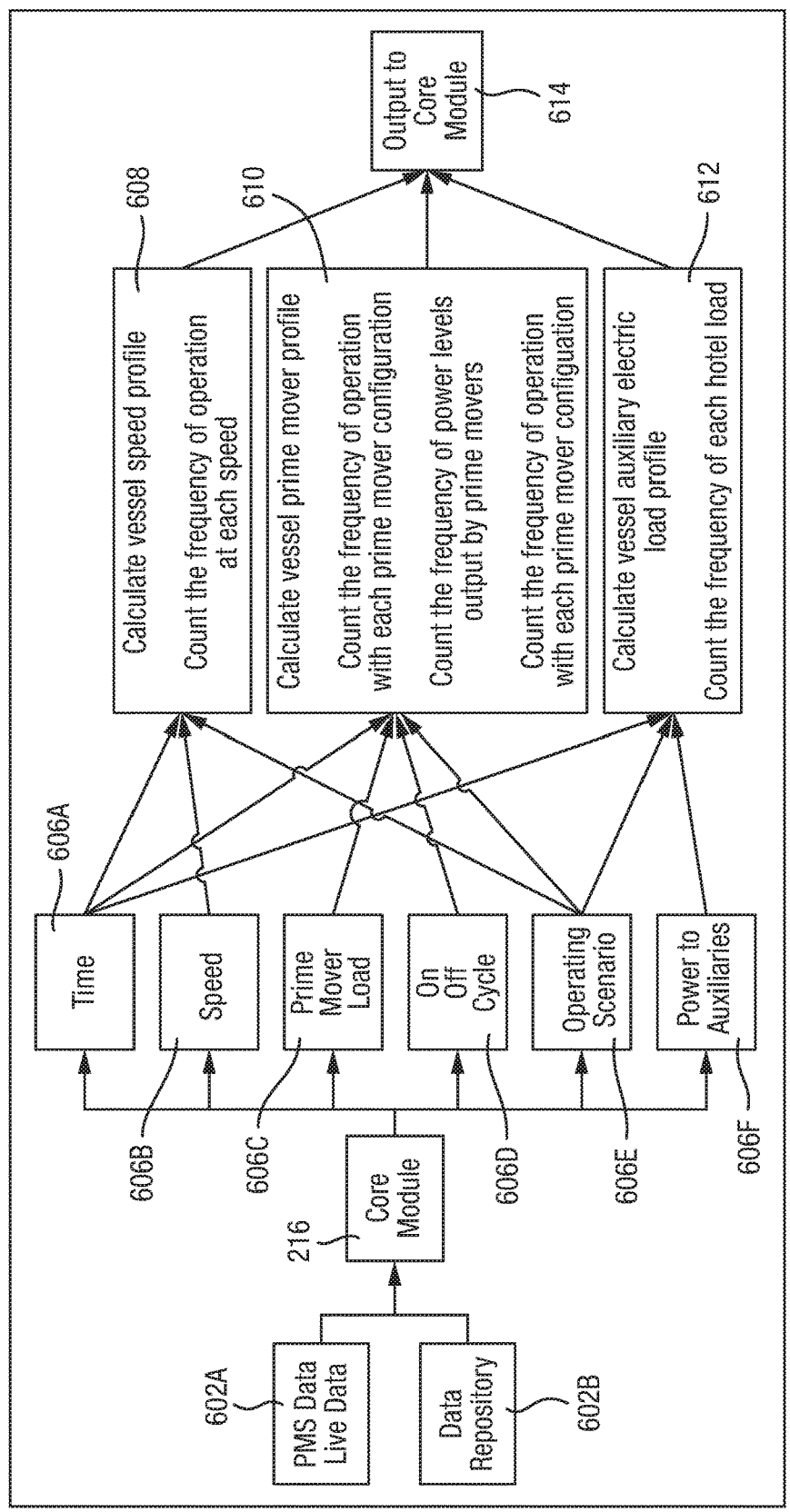
FIG. 6 is a data flow diagram for a second module of the example system.

FIG. 6 describes the flow of data through Module 215B. Inputs representing live PMS data 602A and from data 602B from the data repository are received 604 by the core module 216, which produces outputs 606A-606F that can then be used by various algorithms of the module 215B. In some embodiments, the module 215B can include the following algorithms: Calculate Vessel Speed Profile; Auxiliary Electrical Load Profile; Prime Mover Configuration Profile; Prime Mover Configuration by Speed Profile; Total Prime Mover Power Output.

To calculate the vessel speed profile (process 608), for the ship's speed through the water from 0 to the maximum speed, the number of minutes the vessel spends at each speed were counted. The speeds can be rounded to the nearest whole knot.

To calculate the Auxiliary Electrical Load Profile (process 610), for the ship's total auxiliary electrical load from 0 to the maximum electrical load, the total number of minutes the total auxiliary electrical load at different values in steps of 0.1 MW was counted. The total auxiliary load can be rounded to the nearest 0.1 MW.

To calculate the Prime Mover Configuration Profile (process 612), for each minute of operation, the vessels configuration was calculated, based on the power output from the two gas turbines and two diesel generators. If the power output was greater than zero for a prime mover (and its associated alternator), then it was assumed to be operating. The sensors providing prime mover power output values can include: Prime Mover Power; FWD Gas Turbine Alternator; AFT Gas Turbine Alternator; FWD Diesel Generator and AFT Diesel Generator.

Outputs of processes 608, 610 and 612 can be passed to the core module 216 by process 614.

In some embodiments, there are 16 possible combinations of prime mover, each of which has been designated a unique identifying letter, described in the table below:

TABLE

Prime Mover Configuration Classification

| Configuration | | | | |
|---|---|---|---|---|
| Fwd Gas Turbine | Aft Gas Turbine | Fwd Diesel Generator | Aft Diesel Generator | Identifier |
| On | Off | Off | Off | A |
| Off | On | Off | Off | B |
| On | On | Off | Off | C |
| On | Off | On | Off | D |
| On | Off | Off | On | E |
| On | Off | On | On | F |
| Off | On | On | Off | G |
| Off | On | Off | On | H |
| Off | On | On | On | I |
| On | On | On | Off | J |
| On | On | Off | On | K |
| On | On | On | On | L |
| Off | Off | On | Off | M |
| Off | Off | Off | On | N |
| Off | Off | On | On | O |
| Off | Off | Off | Off | P |

To calculate the Prime Mover Configuration by Speed Profile it was necessary to understand which configuration of prime mover was used to achieve the vessels speed (through the water) profile, each minute spent at a speed was recorded against the prime mover configuration used to achieve that speed. This profile allowed the calculation of 'what/if' scenarios—to highlight the efficiency savings which might be made by changing prime mover configuration, according to the rule set developed in module 215A.

To calculate the Total Prime Mover Power Output, at 1 MW intervals, for the total prime mover power output (the sum of the appropriate sensor parameters), the frequency of occurrence was counted and provided a better understanding of the proportion of time the vessel produces power at various power setting levels.

Module 215C is focussed on vessel energy management. The module allows the generation of 'what if' scenarios to highlight how 'energy saving measures', known as 'Energy Options', might affect the vessel's energy footprint through life.

This module can integrate all the other modules to deliver complete situational awareness of the total energy status of a vessel and/or fleet of vessels (in a future module). This can couple all other modules into a coherent energy/fuel management module, linked to the GUI interface.

This approach, allows energy to be managed as a finite commodity, with inputs such as planned passage and mission profile and onboard electrical energy requirements for the duration of deployment, enabling prediction of future performance—'what if scenario planning' and 'benefit/penalties' of integrating future notional energy reduction measures.

In some embodiments Module 215C can provide:

The ability to 'plug in' future 'synthetic' energy saving/recovery options—representing a 'virtual energy saving solution', described by a set of attributes—in terms of energy efficiency, energy production rates and performance curves, weight, scalability factors, costs (running, maintenance and support, depreciation costs over time, life expectancy, reliability, Mean Time Between Failure (MTBF), etc). Once integrated, 'true' potential energy savings can be quantified and cost/benefit analysis performed against combinations of energy options, prior to fitting and commissioning the energy option into service;

Options can include new operation and maintenance procedures, machinery arrangements, propulsion/supplementary propulsion options, ship design and new metrics and measures.

The ability to perform what/if's on energy options, based on historical trend data acquired over time against a range of usage scenarios—to build the optimum combination of solutions, based on anticipated usage profiles;

The ability to 'network' the 'Energy Manager' with an identical system on other vessels, which may assist a fleet in performing as a single 'energy efficient unit', optimised for most economic cruise and operation across the fleet—considering the current condition and fuel/speed performance of each platform. Taking a system of systems view and approach may lead to moderate savings in fuel consumption, in the order of ~10% (dependent on usage), for example, which may equate to significantly more for a large flotilla in transit across the Atlantic, as an example.

Figure 7:
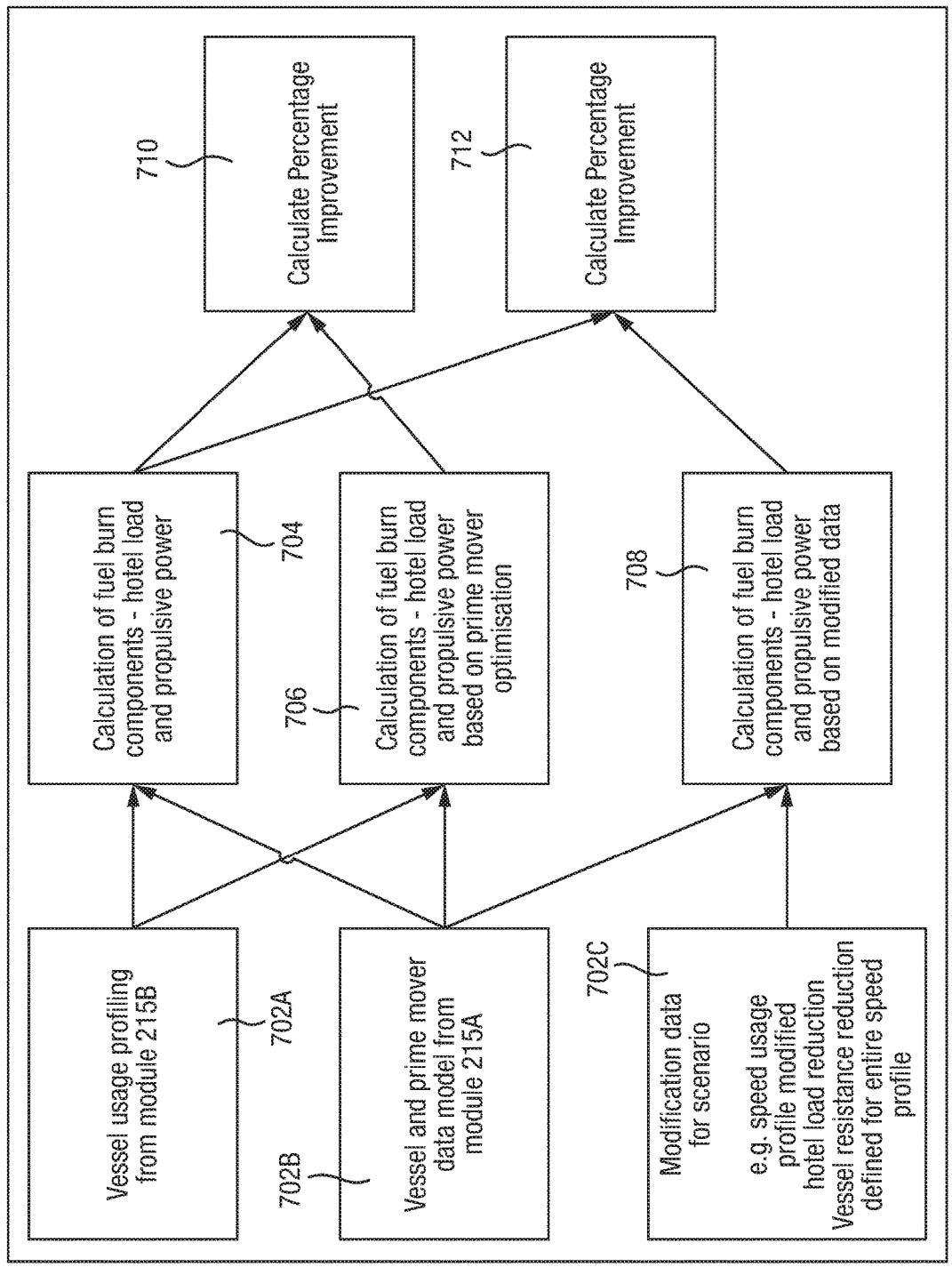
FIG. 7 is a definition diagram of a third module of the example system.

FIG. 7 is a definition diagram for Module 215C and illustrates the principles to be applied. The inputs for the module can include: data 702A representing vessel usage profiling from the module 215B; data 702B representing vessel and prime mover data model from module 215A, and modification data 702C for a scenario, e.g. speed usage profile modified; hotel load reduction; vessel resistance reduction (all defined for entire speed profile).

The data 702A and 702B can be used by process 704, which calculates fuel burn components—hotel load and propulsive power. The data 702A and 702B can also be used by process 706, which calculates fuel burn components—hotel load and propulsive power based on prime mover optimisation. The data 702B and 702C can be used by process 708, which calculates fuel burn components—hotel load and propulsive power based on modified data.

The outputs of processes 704 and 706 can be used by process 710, which calculates the percentage improvements.

The outputs of processes 704 and 708 can be used by process 712, which calculates the relevant percentage improvements.

Once the vessel energy performance has been sufficiently characterised and actual Activity Profiles compiled, from actual data, the system can then be 'tasked', dynamically, to help inform on the benefits (and penalties) of applying a single or range of future energy reduction technologies.

Potential raw fuel cost and volume savings, $CO_2$ emissions, increased range and endurance, and other tangible benefits can be calculated from true data.

This approach can enable the system performance to be estimated, to eliminate effects such as 'self-cancelling' energy measures, energy measures that will not return investment in the lifetime of the vessel, energy measures that only deliver benefit at selected speeds, etc.

Embodiments of the system may also provide the ability to "plug in" future synthetic energy saving/recovery options. Energy saving measures fall into the following example broad categories:

Behavioural (Improved passage planning; Improved Prime Mover Usage Configurations)

Improved efficiency in the current power generation system (Alternative prime mover configurations e.g. diesel at low speeds; Hybrid drive at top speeds; Improved power/drive train efficiency)

Energy Scavenging (Thermal Energy Recovery from Waste exhaust gasses, salt water cooling systems)

Demand Reduction (Low energy components; Reduced hull fouling; Alternative Power)

Embodiments of the system may predominantly address the 'Behavioural' aspects, but it is possible to extend the concept to estimate the benefits and penalties of introducing 'virtual' energy reduction measures and re-calculate what 'could have been saved' had the measure been introduced at a given point in the vessels lifecycle, based on historical usage and predict what could be saved in future, using the performance trends established in module 215A.

Figure 8:
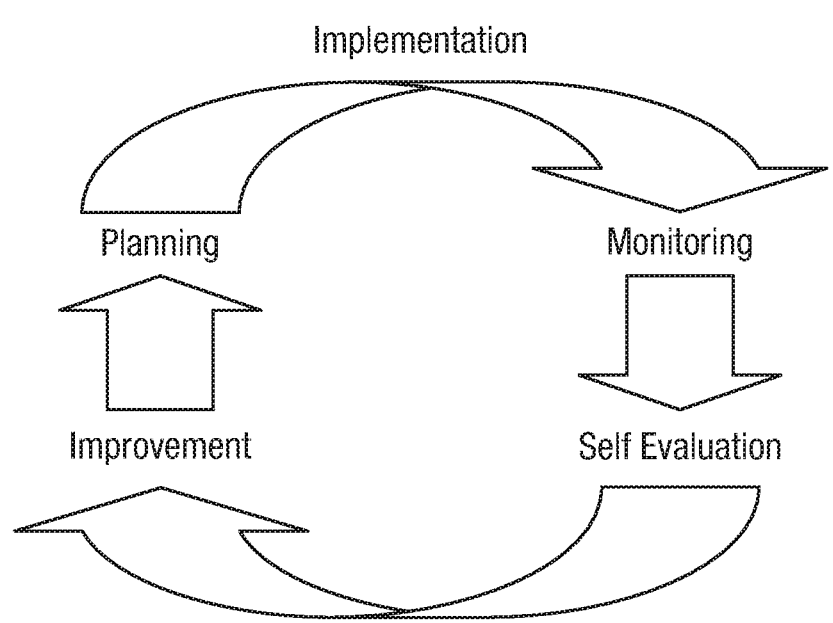
FIG. 8 illustrates a system concept Energy Reduction Cycle.

FIG. 8 illustrates the system concept Energy Reduction Cycle, with modules 215A and 215B providing the monitoring and 'self-evaluation' aspects, to help inform future improvements and planning for implementation. Embodiment of the system re 'open loop', as the sensor data is not routinely collected, derivations and relationships, described earlier in this document, are largely unknown and the interactions between parameters only now being fully understood.

Embodiments of the system including implementation of Modules 215A and 215B can manage energy and fuel usage much more accurately and perform a series of notional 'what/if scenarios', to derive the impact, for display in the Graphical User Interface (GUI). 'Energy 'Options' can be described through a series of attributes, key parameters as illustrated in FIG. 8A. Each attribute has an impact on overall vessel performance, such as the effect of increased displacement on power/speed, operating cost (fuel and maintenance), endurance, etc.

Embodiments of Module 215C can calculate any improvement (in fuel consumption, emissions and operating cost), based on the vessel performance established in module 215A and 215B.

"What/If" functionality can be incorporated into embodiments of the system, e.g. as a separate tab within the GUI. This function utilises the performance and relationship data acquired from Module 215A and 215B and allow the user to perform a series of energy/fuel/endurance impact analysis functions, to assist with passage planning and optimisation of fuel/energy usage. A non-exhaustive list of examples of what/if's is provided below:

For current remaining fuel volume—what will be the remaining endurance be for a given speed envelope vs. alternative speeds and sea states?

For a given volume of fuel (budget), it is possible to re-route? Will we make it if the sea state is X or Y, and what speed will get us there (refuelling/route may be blocked)?

What effect will decreasing fresh water load by X tonnes have on fuel consumption and endurance—if this is done approaching port, while maintaining survivability, how much fuel will be saved?

How much does it cost to get from A-B using the most efficient configuration in transit (it may mean speeding up, than operating on a less-efficient part of the fuel performance curve to get to B quicker, saving energy on hotel/auxiliary power (fuel)?

What is the effect on 'effective fired' running hours of the prime movers if the vessel continues to operate in the current manner, compared with a recommended projected operating profile?

How much waste energy is being emitted up the exhaust uptake for all prime movers as thermal energy for a given period/passage and available for harvesting (function of distance travelled, fuel consumed, calorific value constant, GT and DG efficiency and stack selected minus cooling system waste thermal energy minus acoustic losses, etc)?

If the vessel was operated as efficiently as possible, what could have been saved in emissions, fuel, cost for the passage just completed and over all previous passages?

FIG. 9 onwards are screenshots from an example implementation of the system software. It will be understood that the format and type of information and user interface shown in these Figures is exemplary only and many variations are possible.

FIG. 9 shows an example "Data Readout" screen, which can display a real-time view of the ship sensor data. There may be no user interaction on this screen apart from the Info button (Area A), which provides a description of the screen. Area A shows the FWD & AFT Electrical Load, Power and Alternator data that is being fed into the CD and also their totals (FWD+AFT). Area B shows the Speed Through Water and the GT Fuel Flow Rate. Area C shows how the Gas Turbines (GTs) have been configured (e.g. both ON, FWD ON, etc.) Sea State, Air and Sea Temperatures, Rudder Angle and Draught measurements. (There are a number of anomalous sensor readings apparent on the example PMS, including, for example, Air temperature; Sea temperature; Port, starboard and Aft draught sensors.)

Figure 10:
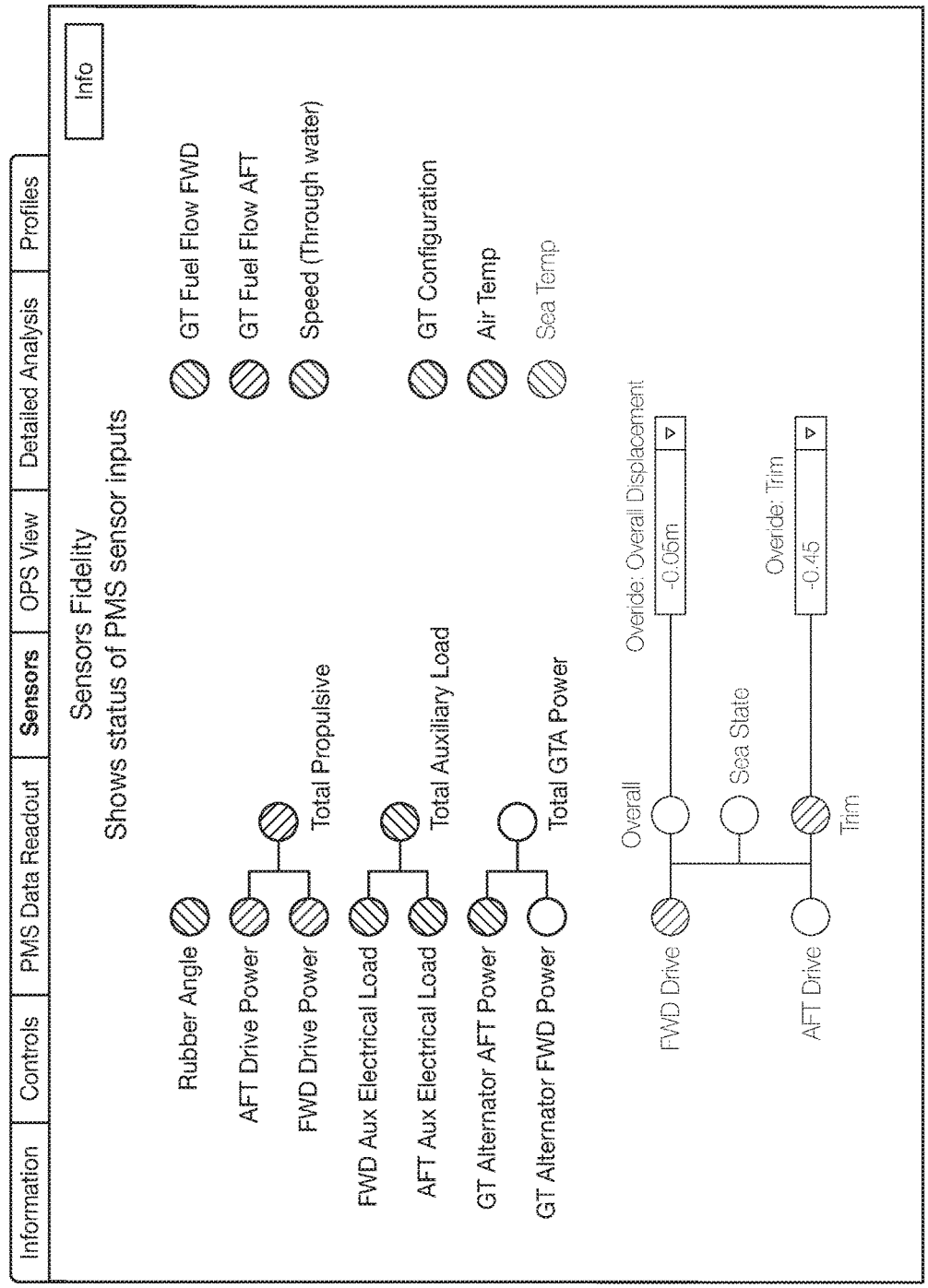

FIG. 10 shows an example "Sensors" screen, which can display an alternative real-time view of the PMS sensor data and/or allow changes to the Displacement and Trim settings. The user can select an alternative setting for the Displacement or Trim by pressing the arrows in Area A and selecting a preferred option from the drop down list. This screen shows the fidelity of the sensors. For example, red indicates that no readings were available from the PMS; amber indicates erratic or 'questionable' behaviour; and green indicates that this sensor is ok.

Figure 11:
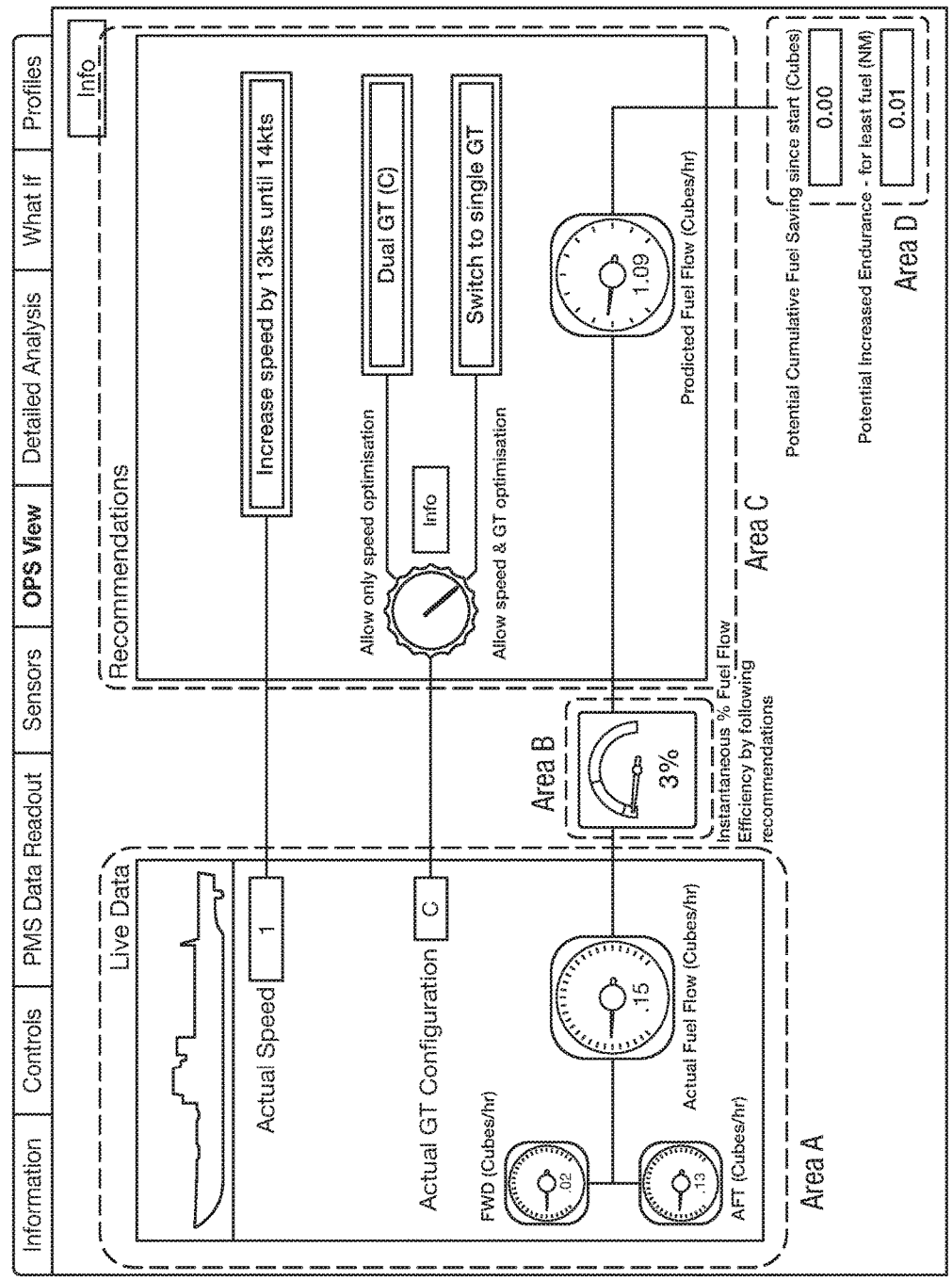

FIG. 11 shows an example OPS screen, which can comprise a behavioural dashboard—e.g. the instructions and key information delivered to an end user, including, for example: the current GT configuration (Area A); the actual fuel flow and speed (Area A); the relative % savings between the Live PMS data being read and the recommendations that the system is calculating in real time (Area B); recommendations about what GT configuration should follow in order to operate in the most efficient manner (Area C); recommendations about what speed the ship should follow in order to operate in the most efficient manner (Area C); the resultant GT fuel flows from following recommendations (Area C); the cumulative fuel saving (Area D) and/or the increased endurance (Area D).

A user may be given the ability to choose between to optimisation modes by switching the dial located in Area C. The two optimisation choices are:

Allow only speed optimisation—keep the GT configuration (could add DG and other configurations as well) of the live data by altering the ship's speed to get efficiencies;

Allow both speed and GT configuration optimisation—the model will always choose the lowest fuel flow and speed, regardless of the GT configuration from the live data.

Area A is a copy of the live sensor data being shown on the sensor readout screen. Area B shows the relative efficiency between the fuel flow being read from the live data and the fuel flow suggested by the chosen optimisation method. Area C shows the recommendations that the optimisation algorithms are making in order to drive the ship more efficiently. Boxes show speed and GT configuration choices and another box allows the user to fix the GT configuration to correspond with the GT configuration of the live data.

The predicted fuel flow shows what the fuel flow would be if speed and configuration recommendations were enacted—it returns the lowest fuel flow point on the fuel flow curves. Area D shows the cumulative effect of savings—if the recommendations had been followed. In other words, it is a comparison between how the ship was driven and how the dashboard would drive the ship. This does not account for operation goals or constraints, e.g. the dashboard may recommend slowing down the ship, but this might have been unacceptable if the ship was on a time critical route and/or the increase charter costs outweigh any fuel saving, etc. Area D is dependent on which optimisation mode is chosen. While optimisation modes can be changed will the model is running, it is recommended a mode is initially chosen before starting the dashboard in order to see the full extent of savings.

Figure 12:
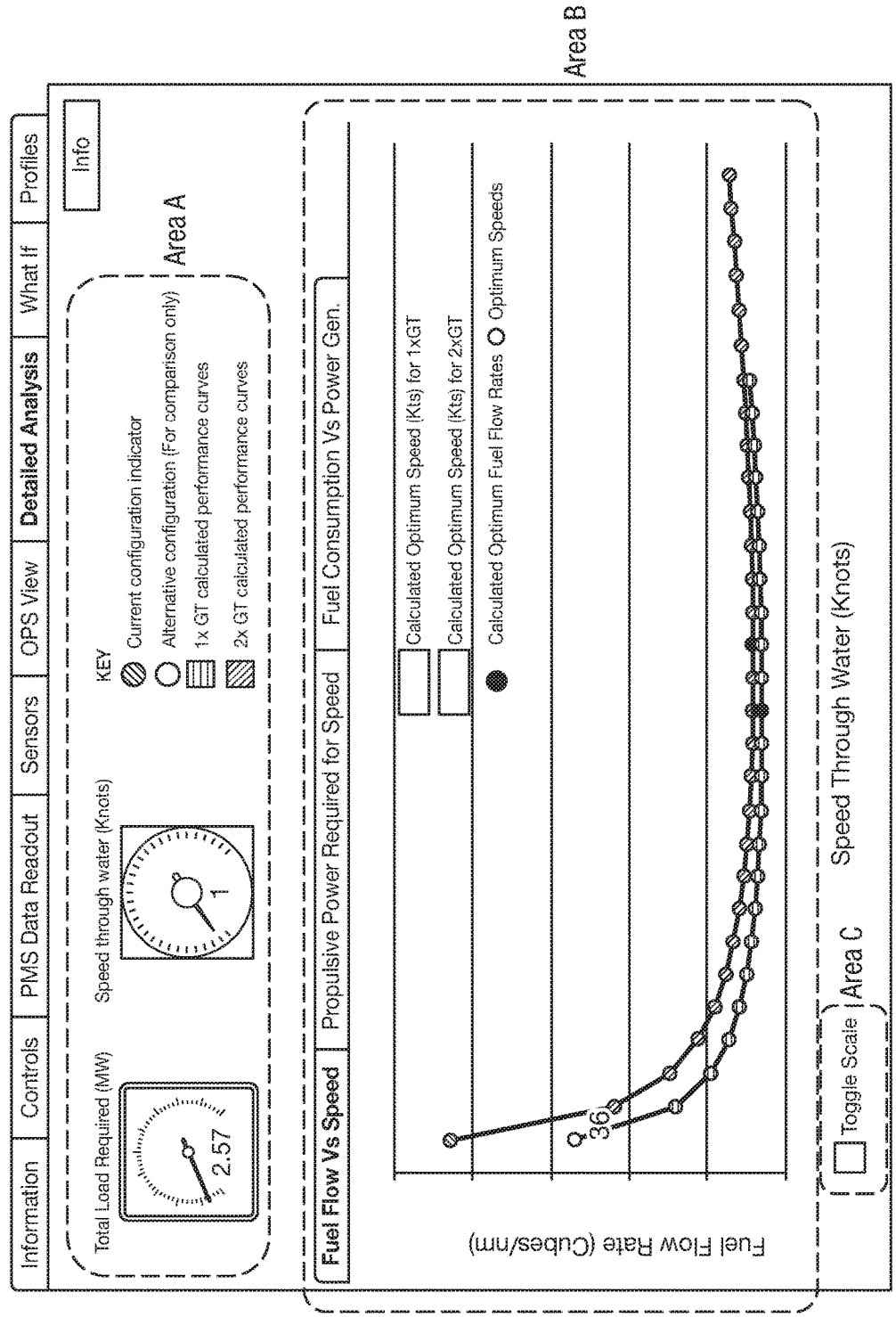

FIG. 12 shows an example of the Detailed Analysis screen, which displays a demonstration of some of the key algorithmic outputs, adjusting in real time based on the live data being analysed. It is not intended for Ships/End User use or demonstration. Additionally, the screen also shows: the Electrical load (Total Alternator Power) requirement; the current speed through water from the PMS data; real-time (updating) graphs of Fuel flow versus speed, Propulsive Power required for speed and Fuel consumption versus power generated.

A user can select the tabs from Area B to choose the different graphs (Fuel flow versus speed, Propulsive Power required for speed or Fuel consumption versus Power Generated). On the Fuel flow versus speed graph, a toggle scale button (Area C) is available. Pressing this button changes the scale so that the characteristic "Hockey Stick" curve can be seen more clearly. This neatly shows how different speeds or even different configurations can be selected and still have the same fuel flow rate. The info button (Area A) can provide a description of the screen.

The Fuel flow Vs. Speed shows a comparison between fuel flow rates for a 1 or 2 GT operation, against the current speed through water. Curves indicate the different plots for 1GT (lower curve in the example) and 2GTs (upper curve in the example), respectively. The dot (below the "2.14" in the notional ship example) shows the current speed and configuration (If the dot is on the upper curve, the current GT configuration is 2GT, if on the lower curve it is 1GT). Numbers indicate fuel flow.

Another dot shows the alternate GT configuration, with the numbers ("1.36" in the notional ship example) indicating the alternate fuel flow. (Alternate refers to 1GT as opposed to 2GT and vice-versa). Highlighted dots (adjacent "0.15" and "0.20" in the example) indicate the lowest fuel flow on each respective curve, with their corresponding speed show in the blue boxes. Optimisation suggestions are created by using the lowest fuel flow, corresponding speed and configuration. Care should be taken to note the units used in this graph, fuel flow is in Cubes/nm.

The purpose of the Propulsive Power Required for Speed graph (selectable via a tab) is to show the propulsive electrical power that is required for the speed (read in from the sensor data) given sea state, trim and displacement, etc. A dot indicates the current speed.

The Fuel Consumption Vs. Power Generated graph (selectable via a tab) shows the power generated versus fuel consumption. Power generated refers to the total alternator power. The curve shows the fuel consumption versus power generation for 2 notional GTs, which adjusts in real time based on the inputs to the dashboard. The amber curve shows the same curve but for 1 GT. The dot indicates the current power generated (from the data) the amber and green figures show the fuel consumption for 1 GT & 2 GT, respectively. Another dot indicates the alternative configuration.

Figure 13:
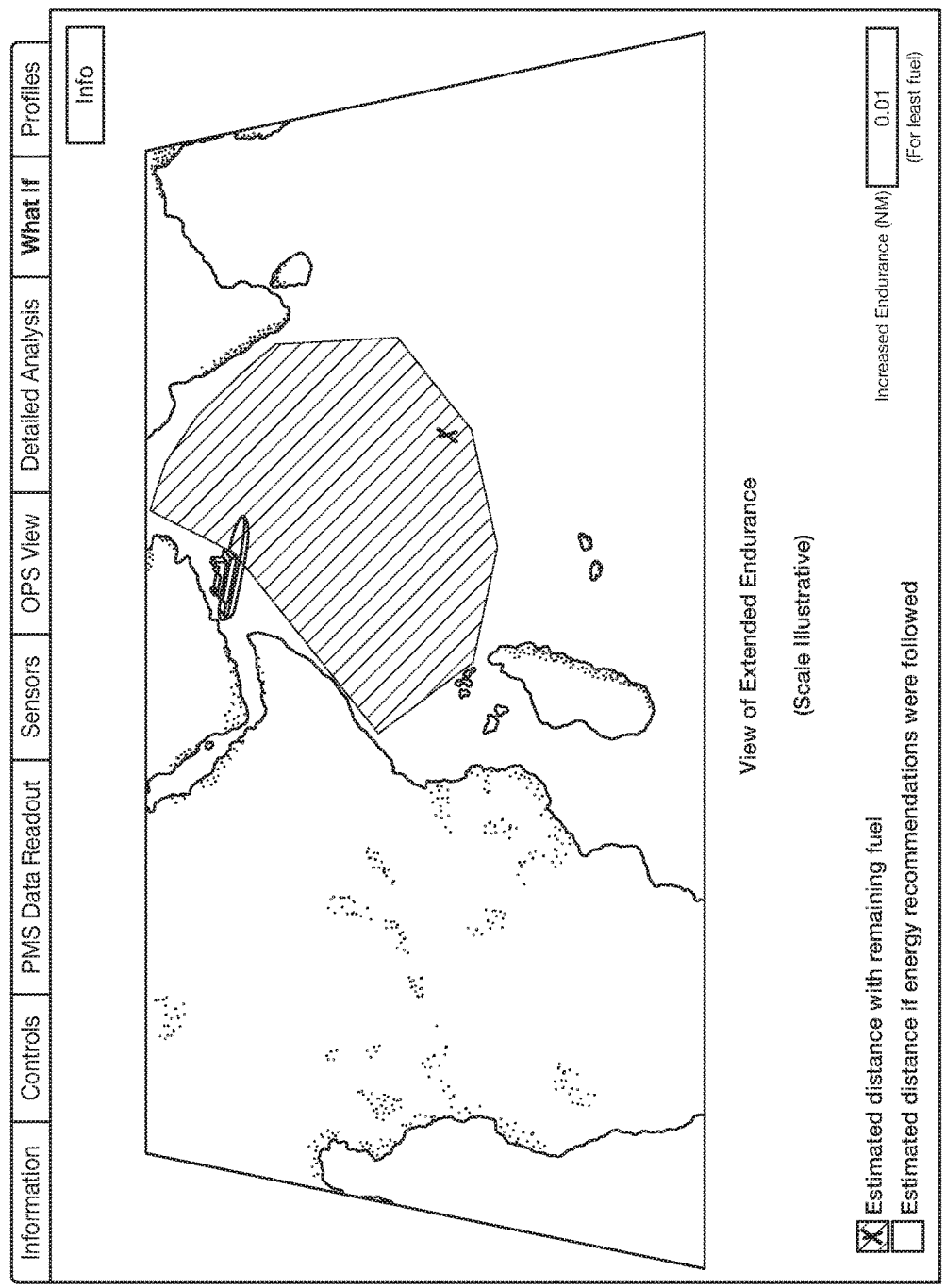

FIG. 13 shows an example of the "What if" screen that can provide a demonstration of how increased endurance may be visualised in a final system. The "Info" button provides a description of the screen. The screen shows an endurance envelope. A display of an initial envelope showing current endurance, based on an estimation of a number of variables—Sea State, Displacement, etc, can be provided. An alternative endurance envelope can then be overlaid— based on the fuel saved by following the recommended settings.

Embodiments of the system can be implemented as both an 'offline' or 'online' decision making aid. The 'offline', or standalone, mode can offer the crew a detailed 'energy planning' aid, serving the needs of logisticians, navigation/passage and mission planners, alike. By knowing the energy performance of the vessel at a point in time and how to aim for the most energy efficient configuration, as well as being able to perform what/if scenario planning in real time can provide a very powerful capability—one input to the many complex decisions the crew have to make on a frequent basis. Being able to estimate if new or alternative passages is achievable is also an important capability. For example, knowing if alternative plans (such as refuelling locations or intervals) are feasible when fuel supply lines are blocked or delayed due, for example, to foul weather or emergencies, is highly important. This can enable the vessel to sustain operations for longer due to unforeseen circumstances, by switching into 'economy' mode. 'Economy mode' is not always to decrease speed, in some instances, for example when operating below 10 knots on 2 GTs, the recommendation may be to actually increase speed for the same fuel consumption, reaching the next waypoint ahead of schedule. Embodiments of the system may also be used to at least partially automate the operations of certain controller of vessel components.

The way in which the prime movers of the vessel were operated and the available combinations determined the available data for analysis and the available options. For example, DG's were found to be predominantly used for hotel/auxiliary power generation and tended not to be used while underway for propulsion power. This usage profile was observed, captured and displayed in the system—thus, driving the prime mover logic/rule set. GTs are not be the most efficient way of operating the vessel at slow speed— where it would certainly be more efficient to use DGs for propulsion power, than operate one or two GTs. These operating procedures have been taken into account and directly influenced the Prime Mover selection ruleset within the system.

It is recognised that increased endurance (projected) will also depend on other important future conditions or 'unknown' factors, not just prime mover and speed configuration. Key factors include: weather conditions (windage, barometric pressure, air and sea temperature); tidal effects; sea state; displacement changes; changes to vessel condition, and other factors, such as variation in fuel quality and equipment condition.

Some embodiments can include a 'Foul Management' module which allows for the impact of fouling to be determined, as an input to the overall vessel performance profile. This can enable decisions to be made on when, for example, to run the vessel at full speed to remove any residual slime from the hull, or to set a 'trigger point' on when a hull scrub is required. Increased drag, caused by hull fouling, is a major contributing factor to increased fuel consumption. Monitoring and managing this aspect more closely in the system can provide a very early benefit in terms of savings in fuel consumption, through improved understanding of the rate of fouling and impact on fuel consumption and setting of 'threshold' points where maintenance/foul removal action is required.

Some embodiments can include an 'Energy Usage and Endurance Planning' tool. Such a tool provides a valuable decision support tool for the crew, to estimate, using actual processed data acquired from the vessel, the effect of vessel operation on fuel consumption and remaining endurance. This can help with assessing feasibility and planning of tasking requests and planning refuelling operations, by knowing remaining endurance and setting a minimum fuel volume threshold, tracking consumption by the hour.

Figure 14:
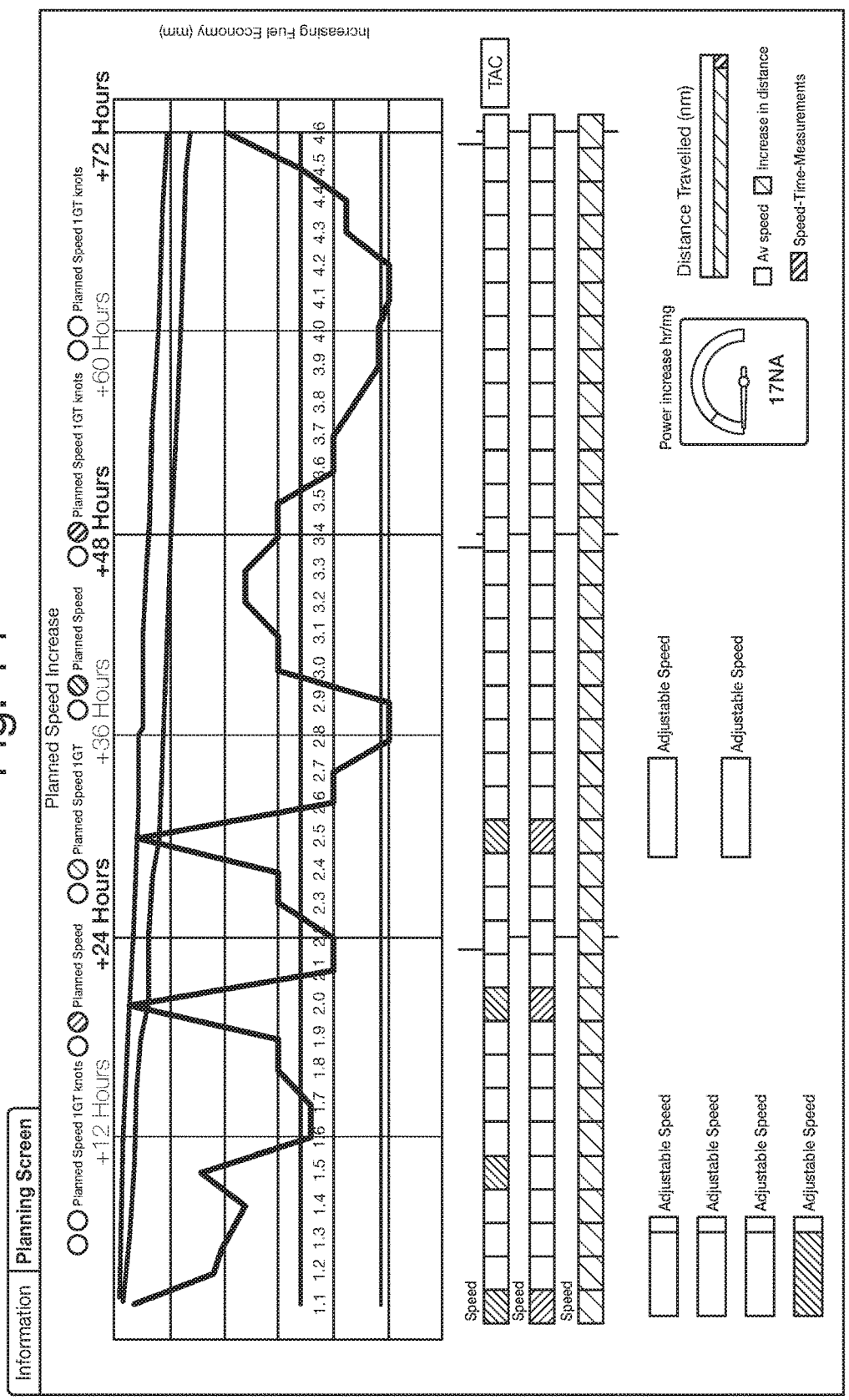
Figure 15:
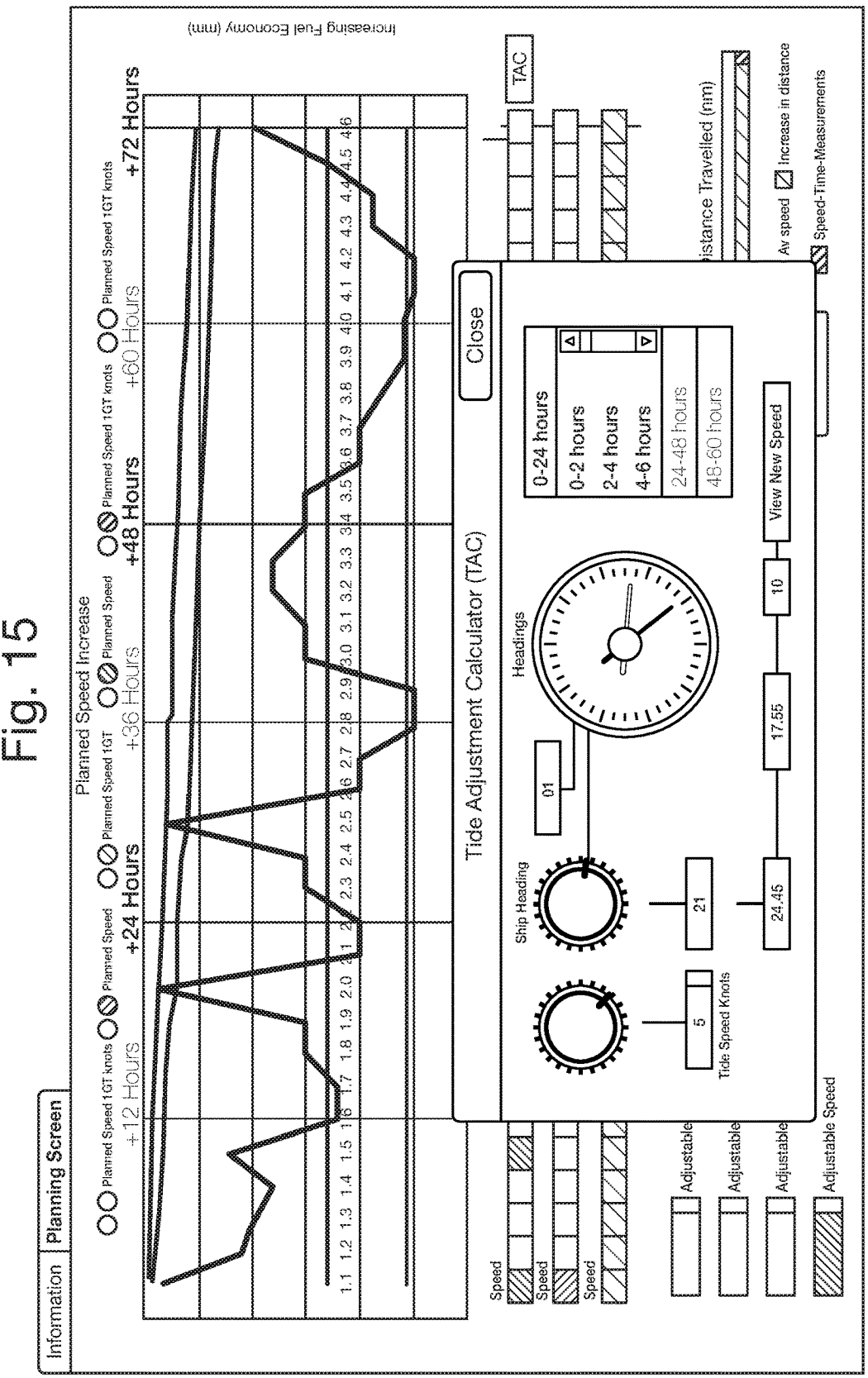

This concept is illustrated in FIG. 14. The function allows the user to plan the speed profile of the vessel passage looking ahead (up to 72 hours in the example) and visualise the impact on fuel usage and endurance. Prime mover configurations can be set and, using the recommendations provided by the system, the most energy efficient configuration to achieve a given objective can be determined. The impact on distance travelled, fuel consumed, estimated time of arrival, cost and minimum fuel vessel stability threshold (remaining fuel volume—used as ballast) can all be visualised in one simple graphical interface. A Tide Adjustment Calculator (TAC) can improve the accuracy of the results, which accounts for the impact of tidal variations for the zone in which the vessel is operating. An implementation of the TAC adjustment is illustrated in FIG. 15.

Figure 16:
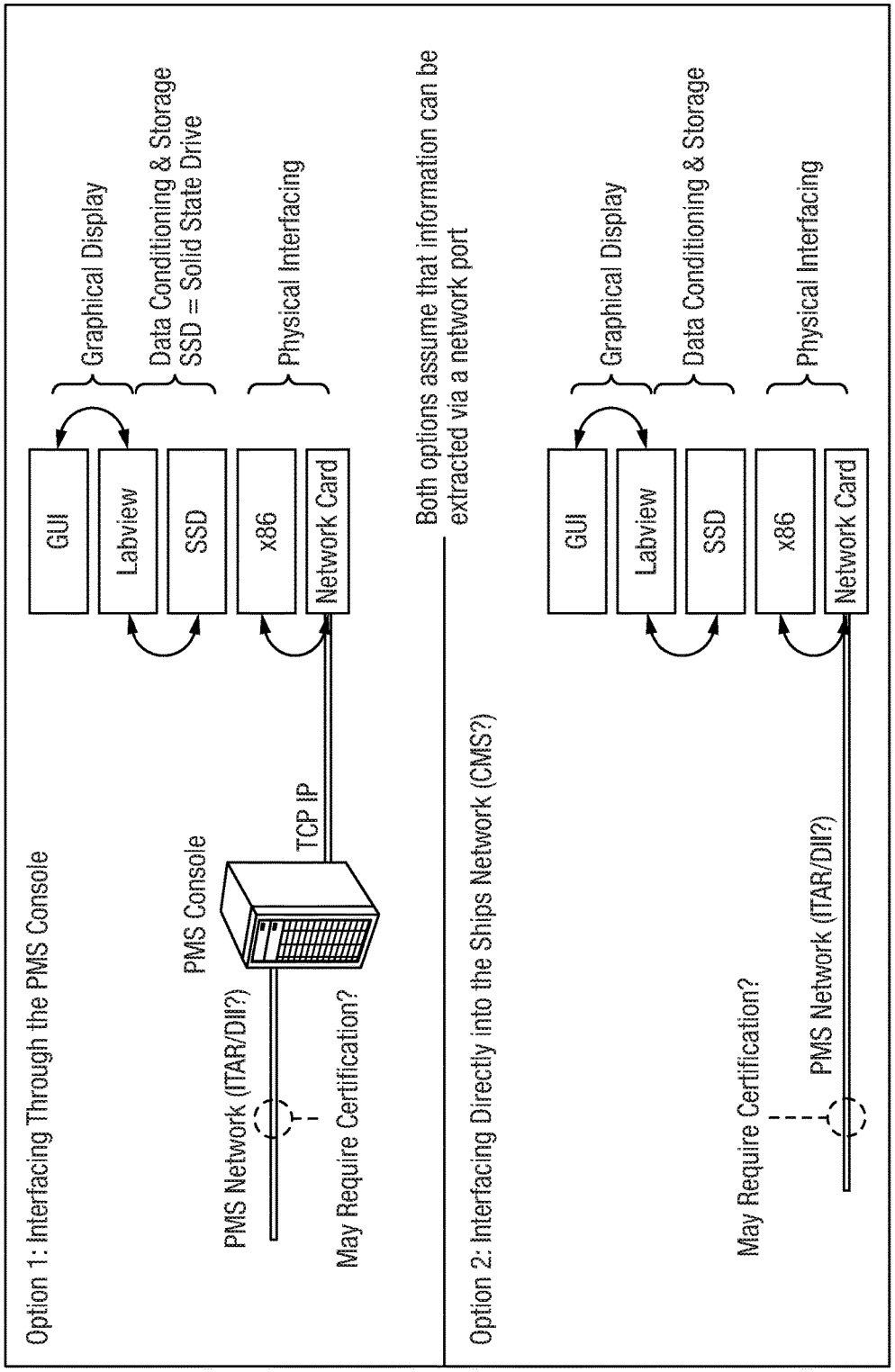
FIG. 16 illustrates a first example architecture for implementing the system.
Figure 17:
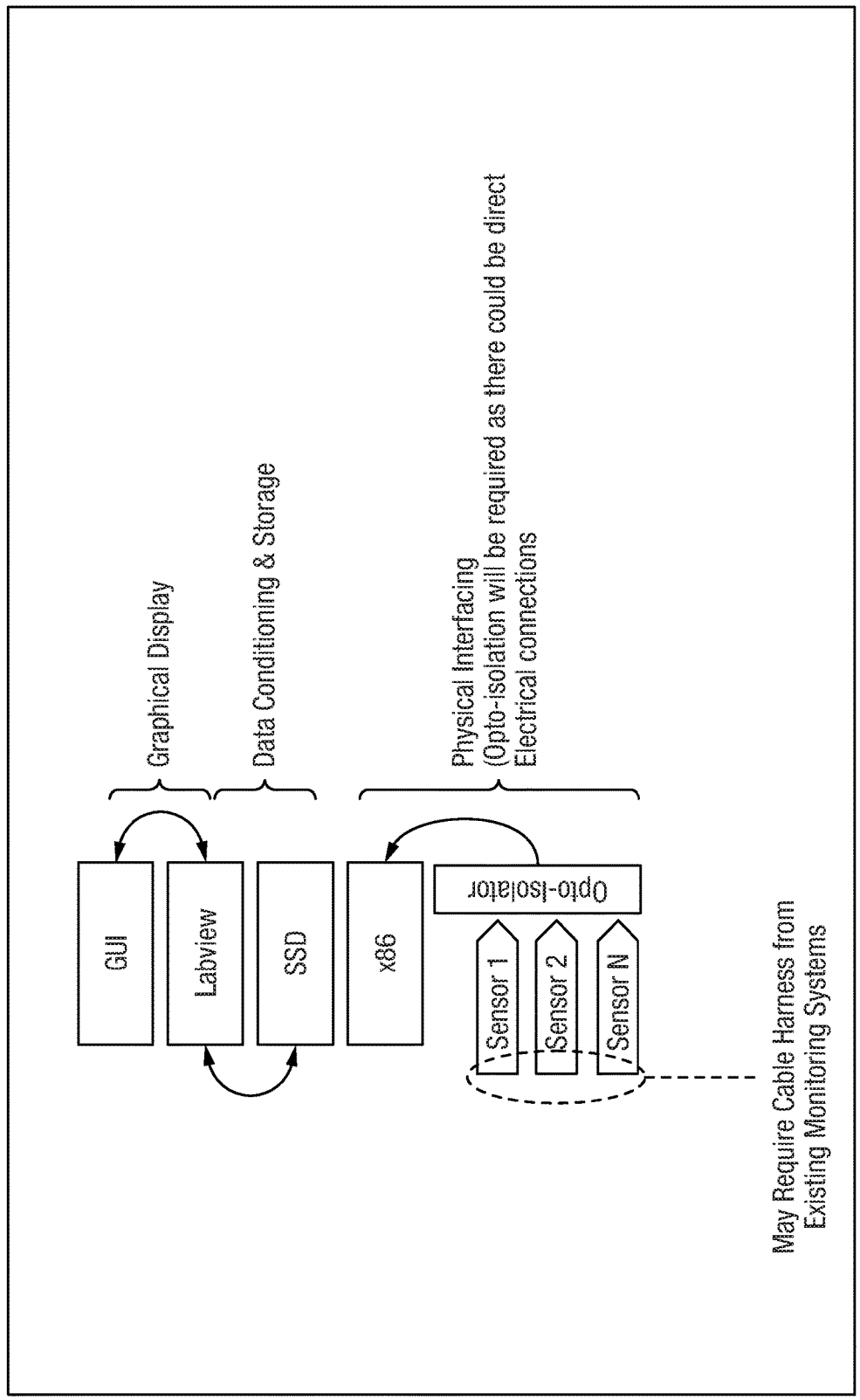
FIG. 17 illustrates another example architecture for implementing the system.

Four main embodiments of the system are summarised below:

Integrated on-ship (interfaced to a PMS or suitable sensor data logging system)—a suitable architecture that fulfils this option has been illustrated in FIG. 16. This option implements a fully automated data transfer system. The physical interface, in this instance, is a direct connection to the PMS system, to enable regular file transfers to take place over a network. This option is likely to require a degree of configuration of the PMS, to provide the data trends required by the system, at regular intervals;

Integrated on-ship (integrated with the vessel's control network)—a suitable architecture that meets this option has been illustrated in FIG. 17. Similar to Option 1 above, it also offers a fully automated data transfer system, but via the vessels' Local Area Network. This offers the additional benefit of locating the system unit (e.g. a ruggedised laptop) anywhere on the vessel—the bridge, for example;

Opto-isolators to sensor inputs—a suitable architecture that meets this option has been illustrated in FIG. 17. This can require extensive interfacing to various sensors located throughout the vessel, using opto-isolators to isolate the system from the existing installation. As this will not affect the performance of existing sensor networks, passing data in one direction, from the sensor network, the impact on existing systems is considered to be minimal. This option poses no data security issues, but adds complexity to the system, adding additional hardware interfaces and sensor logging/data processing to emulate a PMS or data logging function, to interpret and log the sensor readings, prior to passing to the system software for post-processing. This will require both hardware and software development and subsequent certification for safety and approval for installation on the host vessel;

Stand-alone system (updated with regular data transfers from PMS, data loggers or by CD-ROM, for example). This is the simplest and quickest route to getting the system implemented on an operational vessel. By combining manual data entry of simple parameters and a regular manual file data transfer method (at least monthly, via CD-ROM) with a standalone system unit, this version of the system can provide sufficient functionality to permit coarse energy/fuel usage planning and optimisation, based on the last recorded vessel performance profile (up to one month ago). This still offers the advantage of achieving a significant improvement and 'step up' from referencing 'static' performance design data, when planning fuel and energy usage of an actual real vessel. This data upload granularity may be sufficient for fuel/endurance planning and optimisation purposes, given that the overall vessel performance profile is not expected to 'shift' significantly over a monthly period—when supplemented with basic manual inputs (such as remaining fuel level, displacement value and sea state. Manual 'corrections' or 'offset adjustments' can be applied to the previous 'real' snapshot performance model at regular intervals, in between full manual sensor data updates from (to maintain the vessel performance profile and trending algorithms). This approach offers the benefit of a simple to implement system, Combining option 4 above with the 'Energy Usage and Endurance Planning' tool, described earlier, can provide the crew with a significant enhancement to operational energy situational awareness and endurance planning. Such an embodiment of the system can permit the crew to ascertain the impact of their proposed speed profile for the next few days or the whole task at sea and allow what/if scenarios to be simulated on screen, ahead of actual execution. This is especially important where priorities change during execution of a passage plan.

In experiments, embodiments of the system have shown that, for a vessel having an efficient and low activity profile, use of the system can typically reduce energy consumption by a significant amount, e.g. around 28%. This can equate to a cost saving of about tens of millions of pounds over the operating life of the vessel. Consequential benefits, such as reduced logistics support, can also provide comparable cost savings over the lifetime.

It will be apparent to the skilled person that the examples described herein can be combined or adapted in various ways to satisfy the needs of any particular application. For example, individual devices in a multiplexed configuration can be configured as voltage monitors or switch closure detection as required. Embodiments of the device offer a flexible, scalable, rugged and low power solution to many different discrete input sensing requirements. Embodiments of the device can either be manufactured as an integral part of an electrical component to sense its state, or be added/retro-fitted onto an existing component.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of monitoring energy usage of a surface maritime vessel, the method comprising:

receiving characteristic data representing actual values of at least one operating condition of the vessel, the operating conditions including at least propulsion power consumption, hotel power consumption, speed, trim, and fuel flow of the vessel;

modelling energy usage of the vessel over a range of values of the operating conditions using an energy usage model for the vessel;

comparing an actual energy usage of the vessel corresponding to the actual values of the operating conditions to a plurality of modelled energy usage values corresponding to the range of modelled values of the operating conditions;

based on the comparison, determining an efficient distribution of power generation between at least a first engine and a second engine of the vessel; and adjusting the distribution of power generation between the first engine and the second engine to match the determined efficient distribution.

2. The method according to claim 1, wherein the energy usage model comprises a power vs speed curve for the vessel calculated for a plurality of sets of operating conditions that include vessel displacement, sea state, and/or vessel trim.

3. The method according to claim 2, wherein the operating conditions are based on a speed through water of the vessel, a draught of the vessel, power provided to at least one propulsion device of the vessel.

4. The method according to claim 2, further including:
receiving data corresponding to a hotel load of the vessel;
determining a total power used by the vessel that includes the hotel load data and power used by at least one propulsion device of the vessel;
finding a minimum value on the power vs speed curve corresponding to the total determined power used; and
providing the minimum value as an indication of a most efficient speed of the vessel.

5. The method according to claim 2, further including generating or updating a said energy usage model comprising the power vs speed curve, wherein the generating or updating includes:
obtaining data representing propulsion power used by the vessel and corresponding vessel speed for a said operating characteristic;
computing a curve based on the obtained data;
computing coefficients of the curve; and
generating or updating the energy usage model using the coefficients.

6. The method according to claim 1, wherein the energy usage model comprises a fuel consumption vs power output profile for one or more temperature, pressure, and/or prime mover configurations for the vessel.

7. The method according to claim 1, further including updating the energy usage model using the received characteristic data.

8. The method according to claim 1, wherein processing the characteristic data comprises:
computing a plurality of propulsive power vs speed through water curves representing one or more vessel displacements, one or more sea states, and one or more vessel trim categories; and
computing a plurality of fuel use vs power generated curves representing one or more vessel propulsion unit configurations.

9. The method according to claim 1, further comprising presenting an efficiency curve that gives an indication of a speed for optimizing fuel consumption based on the adjusted distribution of power generation between the first engine and the second engine, and a configuration of one of the engines as a prime mover of the vessel.

10. The method according to claim 9, wherein the presented efficiency curve is used to directly modify operating conditions of the vessel to improve energy usage/efficiency.

11. The method according to claim 1, wherein the energy usage model comprises a first energy usage model and a second energy usage module, the first energy usage model representing the vessel using one propulsion device, and the second energy usage model representing the vessel using more than one propulsion device.

12. The method according to claim 1, wherein the energy usage model is at least initially generated using data representing sensor readings of the characteristic data taken at intervals of about 1 minute.

13. The method according to claim 1, wherein the characteristic data further includes vessel draught; ambient air temperature; water temperature; rudder position; forward/aft engine load or power; shaft speed; and fin angle, and wherein the fuel flow further includes fuel flow rate to at least one propulsion device.

14. A system configured to monitor energy usage of a surface maritime vessel, the system comprising:
one or more memories for storing data; and
one or more processors configured to
receive characteristic data representing actual values of at least one operating condition of the vessel, the operating conditions including at least propulsion power consumption, hotel power consumption, speed, trim, and fuel flow of the vessel,
modelling energy usage of the vessel over a range of values of the operating conditions using an one energy usage model for the vessel, and
comparing an actual energy usage of the vessel corresponding to the actual values of the operating conditions to a plurality of modelled energy usage values corresponding to the range of modelled values of the operating conditions;
based on the comparison, determining an efficient distribution of power generation between at least a first engine and a second engine of the vessel; and
adjusting the distribution of power generation between the first engine and the second engine to match the determined efficient distribution.

15. A vessel including the system according to claim 14.

16. One or more non-transitory machine-readable mediums encoding instructions that when executed by one or more processors cause a process to be carried out for monitoring energy usage of a surface maritime vessel, the process comprising:
receive characteristic data representing actual values of at least one operating condition of the vessel, the operating conditions including at least propulsion power consumption, hotel power consumption, speed, trim, and fuel flow of the vessel;
modelling energy usage of the vessel over a range of values of the operating conditions using an one energy usage model for the vessel; and
comparing an actual energy usage of the vessel corresponding to the actual values of the operating conditions to a plurality of modelled energy usage values corresponding to the range of modelled values of the operating conditions;
based on the comparison, determining an efficient distribution of power generation between at least a first engine and a second engine of the vessel; and
adjusting the distribution of power generation between the first engine and the second engine to match the determined efficient distribution.

17. The one or more non-transitory machine-readable mediums according to claim 16, wherein the energy usage model comprises a power vs speed curve for the vessel calculated for a plurality of sets of operating conditions that include vessel displacement, sea state, and/or vessel trim, and wherein the operating conditions are based on a speed through water of the vessel, a draught of the vessel, and power provided to at least one propulsion device of the vessel.

18. The one or more non-transitory machine-readable mediums according to claim 17, the process further including:
   receiving data corresponding to a hotel load of the vessel;
   determining a total power used by the vessel that includes the hotel load data and power used by at least one propulsion device of the vessel;
   finding a minimum value on the power vs speed curve corresponding to the total determined power used; and
   providing the minimum value as an indication of a most efficient speed of the vessel.

19. The one or more non-transitory machine-readable mediums according to claim 18, the process further comprising: causing modification of operating conditions of the vessel, based on the provided minimum value, to improve energy usage/efficiency.

20. The one or more non-transitory machine-readable mediums according to claim 16, wherein the characteristic data further includes vessel draught; ambient air temperature; water temperature; rudder position; forward/aft engine load or power; shaft speed; and fin angle, and wherein the fuel flow further includes fuel flow rate to at least one propulsion device.

* * * * *